United States Patent
Corten et al.

(10) Patent No.: US 10,920,100 B2
(45) Date of Patent: Feb. 16, 2021

(54) METHOD FOR PRODUCING A MULTI-LAYERED COATING

(71) Applicant: BASF COATINGS GMBH, Münster (DE)

(72) Inventors: Cathrin Corten, Unna (DE); Dirk Eierhoff, Muenster (DE); Patrick Wilm, Ahlen (DE); Britta Schnieders, Meppen (DE); Nicole Freitag, Muenster (DE); Heinz-Ulrich Grumpe, Muenster (DE); Joerg Schwarz, Muenster (DE)

(73) Assignee: BASF COATINGS GMBH, Münster (DE)

( * ) Notice: Subject to any disclaimer, the term of this patent is extended or adjusted under 35 U.S.C. 154(b) by 263 days.

(21) Appl. No.: 15/779,168

(22) PCT Filed: Jun. 3, 2016

(86) PCT No.: PCT/EP2016/062586
§ 371 (c)(1),
(2) Date: May 25, 2018

(87) PCT Pub. No.: WO2017/088988
PCT Pub. Date: Jun. 1, 2017

(65) Prior Publication Data
US 2019/0062588 A1 Feb. 28, 2019
US 2020/0199398 A9 Jun. 25, 2020

(30) Foreign Application Priority Data
Nov. 26, 2015 (EP) .................................... 15196416

(51) Int. Cl.
*C09D 153/00* (2006.01)
*B05D 7/14* (2006.01)
(Continued)

(52) U.S. Cl.
CPC ............. *C09D 153/00* (2013.01); *B05D 7/14* (2013.01); *B05D 7/532* (2013.01); *C09D 5/00* (2013.01);
(Continued)

(58) Field of Classification Search
CPC ........ C09D 153/00; C09D 5/002; C09D 5/00; B05D 7/14; B05D 7/532; B05D 2451/00; C25D 13/04; C25D 13/22
See application file for complete search history.

(56) References Cited

U.S. PATENT DOCUMENTS

| 4,914,148 | A |   | 4/1990 | Hille et al. |
| 5,334,420 | A | * | 8/1994 | Hartung ................. B05D 7/532 427/407.1 |

(Continued)

FOREIGN PATENT DOCUMENTS

| DE | 4009858 A1 | 10/1991 |
| DE | 4437535 A1 | 4/1996 |

(Continued)

OTHER PUBLICATIONS

European Search Report for EP Patent Application No. 15196416.0, dated May 25, 2016, 3 pages.
(Continued)

*Primary Examiner* — Xiuyu Tai
(74) *Attorney, Agent, or Firm* — Armstrong Teasdale LLP

(57) ABSTRACT

Provided herein is a method for producing a multicoat paint system on a metallic substrate by producing a basecoat or a plurality of directly successive basecoats directly on a metallic substrate coated with a cured electrocoat system, producing a clearcoat directly on the one or the topmost of the plurality of basecoats, and subsequently jointly curing the one or the plurality of basecoats and the clearcoat, wherein at least one basecoat material used for producing (Continued)

the basecoats includes at least one aqueous dispersion which includes a polymer whose preparation includes successive radical emulsion polymerization of three mixtures of olefinically unsaturated monomers.

20 Claims, 1 Drawing Sheet

(51) Int. Cl.
*B05D 7/00* (2006.01)
*C09D 5/00* (2006.01)
*C25D 13/04* (2006.01)
*C25D 13/22* (2006.01)

(52) U.S. Cl.
CPC .............. *C09D 5/002* (2013.01); *C25D 13/04* (2013.01); *C25D 13/22* (2013.01); *B05D 2451/00* (2013.01)

(56) References Cited

U.S. PATENT DOCUMENTS

| | | | |
|---|---|---|---|
| 5,641,574 A * | 6/1997 | Kasari | B05D 7/532 428/413 |
| 6,001,915 A | 12/1999 | Schwarte et al. | |
| 6,632,915 B1 | 10/2003 | Schwarte et al. | |
| 6,737,468 B1 | 5/2004 | Bremser et al. | |
| 2003/0175434 A1 | 9/2003 | Wegner et al. | |
| 2006/0155022 A1 | 7/2006 | Hupp et al. | |
| 2016/0236234 A1 | 8/2016 | Steinmetz et al. | |
| 2016/0319152 A1 | 11/2016 | Reuter et al. | |
| 2016/0326665 A1* | 11/2016 | Steinmetz | B05D 7/577 |
| 2017/0073446 A1 | 3/2017 | Corten et al. | |

FOREIGN PATENT DOCUMENTS

| | | |
|---|---|---|
| DE | 19930665 A1 | 1/2001 |
| DE | 19948004 A1 | 7/2001 |
| DE | 10043405 C1 | 6/2002 |
| EP | 0228003 A1 | 7/1987 |
| EP | 1534792 A1 | 6/2005 |
| JP | H06179726 A | 6/1994 |
| JP | 2004059623 A | 2/2004 |
| WO | 9115528 A1 | 10/1991 |
| WO | 9215405 A1 | 9/1992 |
| WO | 9316139 A1 | 8/1993 |
| WO | WO-98/23390 A1 | 6/1998 |
| WO | 9833835 A1 | 8/1998 |
| WO | 0102498 A1 | 1/2001 |
| WO | WO-01/25307 A1 | 4/2001 |
| WO | 2004018580 A1 | 3/2004 |
| WO | 2006042585 A1 | 4/2006 |
| WO | 2008074490 A1 | 6/2008 |
| WO | 2009077182 A1 | 6/2009 |
| WO | 2014033135 A2 | 3/2014 |
| WO | 2015090801 A1 | 6/2015 |
| WO | 2015090814 A1 | 6/2015 |
| WO | WO-2015/090799 A1 | 6/2015 |
| WO | WO-2015/091204 A1 | 6/2015 |
| WO | WO-2016/116299 A1 | 7/2016 |

OTHER PUBLICATIONS

Hong, et al, "Core/Shell Acrylic Microgel as the Main Binder of Waterborne Metallic Basecoats", Korea Polymer Journal, vol. 7, Issue 4, Aug. 1999, pp. 213-222.
International Search Report for International Application No. PCT/EP2016/062586, dated Jul. 18, 2016, 2 pages.

* cited by examiner

METHOD FOR PRODUCING A MULTI-LAYERED COATING

CROSS-REFERENCE TO RELATED APPLICATIONS

This application is the national stage entry of PCT/EP2016/062586, filed on Jun. 3, 2016, which claims the benefit of priority to European Patent Application No. 15196416.0, filed Nov. 26, 2015, which is incorporated by reference in its entirety herein.

The present invention relates to a method for producing a multicoat paint system by producing a basecoat or a plurality of directly successive basecoats directly on a metallic substrate coated with a cured electrocoat system, producing a clearcoat directly on the one or the topmost of the plurality of basecoats, and subsequently jointly curing the one or the plurality of basecoats and the clearcoat. The present invention further relates to a multicoat paint system produced by the method of the invention.

BACKGROUND

Multicoat paint systems on metallic substrates, examples being multicoat paint systems in the automobile industry sector, are known. Starting, conceptually, from the metallic substrate, such multicoat paint systems generally comprise an electrocoat, a coat applied directly to the electrocoat and commonly referred to as primer-surfacer coat, at least one coat which comprises color and/or effect pigments and is generally referred to as a basecoat, and also a clearcoat.

The fundamental compositions and functions of the stated coats, and the coating compositions necessary to the construction of these coats, namely electrocoat materials, primer-surfacers, coating compositions that comprise color and/or effect pigments and are known as basecoat materials, and clearcoat materials, are known. For example, the electrophoretically applied electrocoat serves fundamentally to protect the substrate from corrosion. The primer-surfacer coat serves primarily to protect against mechanical exposure such as stone chipping, for example, and also to level out unevennesses in the substrate. The next coat, called the basecoat, is primarily responsible for producing esthetic qualities such as the color and/or effects such as the flop, while the clearcoat that then follows serves in particular for scratch resistance and also for gloss on the part of the multicoat paint system.

In the prior art these multicoat paint systems are produced by first applying or depositing an electrocoat material, more particularly a cathodic electrocoat material, electrophoretically on the metallic substrate, an automobile body, for example. The metallic substrate may undergo various pretreatments before the electrocoat material is deposited: for example, known conversion coatings such as phosphate coats, more particularly zinc phosphate coats, may be applied. The operation of depositing the electrocoat material takes place generally in corresponding electrocoating tanks. Following application, the coated substrate is removed from the tank, optionally rinsed and flashed and/or subjected to interim drying, and finally the applied electrocoat material is cured. The aim here is for coat thicknesses of around 15 to 25 micrometers. The primer-surfacer is then applied directly to the cured electrocoat, with optional flashing and/or interim drying, and subsequent curing. To allow the cured primer-surfacer coat to fulfill the functions identified above, coat thicknesses of 25 to 45 micrometers, for example, are the aim. Next, directly atop the cured primer-surfacer coat, a basecoat material is applied, comprising color and/or effect pigments, which is optionally flashed and/or subjected to interim drying, and a clearcoat material is applied directly to the thus-produced basecoat, without separate curing. The basecoat and the clearcoat, optionally likewise flashed and/or subjected to interim drying beforehand, are then jointly cured (wet-on-wet method). Whereas the cured basecoat in principle has comparatively low coat thicknesses of 10 to 20 micrometers, for example, the aim for the cured clearcoat is for coat thicknesses of 30 to 60 micrometers, for example, in order to attain the technological applications properties described.

Applying primer-surfacer, basecoat, and clearcoat materials can be done using, for example, the techniques of application, known to the skilled person, of pneumatic and/or electrostatic spray application. Primer-surfacer and basecoat materials are nowadays being used, simply for environmental reasons, increasingly in the form of aqueous coating materials.

Multicoat paint systems of these kinds, and methods for producing them, are described in, for example, DE 199 48 004 A1, page 17, line 37, to page 19, line 22, or else DE 100 43 405 C1, column 3, paragraph [0018], and column 8, paragraph [0052] to column 9, paragraph [0057], in conjunction with column 6, paragraph [0039] to column 8, paragraph [0050].

Although the multicoat paint systems produced accordingly may generally meet the requirements imposed by the automotive industry in terms of technological applications properties and esthetic profile, the focus of the automakers nowadays is increasingly coming to rest, as a result of environmental and economic factors, on the simplification of the comparatively complex production operation described.

So there are approaches which attempt to do without the separate step of curing the coating composition applied directly to the cured electrocoat (that is, the coating composition referred to as primer-surfacer within the standard method described above), and at the same time, possibly, to lower the coat thickness of the coating film produced from this coating composition, as well. Within the art, this coating film, which is therefore not separately cured, is then frequently called the basecoat (and no longer the primer-surfacer coat) or, to distinguish it from a second basecoat film applied atop it, it is called the first basecoat film. In some cases an attempt is even made to do entirely without this coating film (in which case, then, merely a so-called basecoat film is produced directly on the electrocoat film, over which, without a separate curing step, a clearcoat material is applied; in other words, ultimately, a separate curing step is likewise omitted). In place of the separate curing step and of an additional concluding curing step, then, the intention is to have merely one, concluding curing step following application of all of the coating films applied to the electrocoat film.

Avoiding a separate curing step for the coating composition applied directly to the electrocoat is very advantageous from environmental and economic aspects. The reason is that it saves energy and allows the production operation as a whole to proceed with substantially less stringency, of course.

Instead of the separate curing step, then, it is an advantage for the coating produced directly on the electrocoat to be merely flashed at room temperature and/or subjected to interim drying at elevated temperatures, without carrying out curing which, as is known, regularly necessitates elevated curing temperatures and/or long curing times.

A problem, however, is that with this form of production, it is nowadays often not possible to obtain the requisite technological applications properties and esthetic properties.

For instance, as a result of the absence of separate curing of the coating applied directly to the electrocoat, the first basecoat, for example, prior to the application of further coating compositions, such as a second basecoat material and a clearcoat material, for example, there may be unwanted inclusions of air, solvent and/or moisture, which may manifest themselves in the form of blisters beneath the surface of the overall paint system and may break open during the concluding cure. The holes which are formed as a result of this in the paint system, such holes also being called pinholes and pops, lead to a deleterious visual appearance. The amount of organic solvent and/or water arising as a result of the overall construction of first basecoat, second basecoat, and clearcoat, and also the amount of air introduced through the application method, is too great for the entire amount to be able to escape from the multicoat paint system within a concluding curing step without defects being produced. In the case of a conventional production operation as described above, in which the primer-surfacer coat is baked separately prior to the production of a usually comparatively thin basecoat (which hence has only a comparatively low air, organic solvents and/or water content), the solution to this problem is of course much less demanding.

However, the problems described with pinholes and pops are also frequently encountered in the production of multicoat paint systems where the use of the coating composition identified as a primer-surfacer in the standard operation is forgone entirely, in other words systems in which, consequently, only a basecoat material is applied direct to the cured electrocoat. The reason is that, depending on the application and use of the multicoat paint system to be produced, in the case of complete absence of the coating referred to as a primer-surfacer coat in standard operation, the thickness of basecoat required is generally greater than that in the standard systems, in order to obtain the desired properties. In this case as well, therefore, the overall film thickness of coating films which must be cured in the concluding curing step is substantially higher than in standard operation.

Other relevant properties as well are not always satisfactorily achieved when multicoat paint systems are built up by way of the method described. For example, the attainment of a high-grade overall appearance, which is influenced in particular by effective leveling on the part of the coating compositions used, represents a challenge. Here, the rheological properties of the coating compositions must be custom-tailored to the operating regime described. Similar comments apply in relation to retention of appropriate stability against runs. A further difficulty is that of obtaining adequate adhesion.

It would therefore be advantageous to have a method for producing multicoat paint systems that removes the need for a separate curing step, as described above, for the coating composition applied directly to the electrocoat, with the multicoat paint system produced nevertheless having excellent technological applications properties, more particularly esthetic properties.

SUMMARY

A problem addressed by the present invention, accordingly, was that of finding a method for producing a multicoat paint system on metallic substrates wherein the coating composition applied directly to the electrocoat system is not cured separately, but instead this coating composition is cured in a joint curing step with further coating films applied subsequently. In spite of this simplification of method, the resultant multicoat paint systems ought to exhibit outstanding technological applications properties, more particularly esthetic properties and adhesion properties. Moreover, it ought in this way to be possible to provide, according to requirements and individual area of use, multicoat paint systems in which the one or the two or more coating film(s) disposed between electrocoat and clearcoat can have variable coat thicknesses and in which in particular no problems with pinholes occur even at relatively high coat thicknesses.

It has been found that the problems identified can be solved by means of a new method for producing a multicoat paint system (M) on a metallic substrate (S), comprising (1) producing a cured electrocoat (E.1) on the metallic substrate (S) by electrophoretic application of an electrocoat material (e.1) to the substrate (S) and subsequent curing of the electrocoat material (e.1), (2) producing (2.1) a basecoat (B.2.1) or (2.2) two or more directly successive basecoats (B.2.2.x) directly on the cured electrocoat (E.1) by (2.1) application of an aqueous basecoat material (b.2.1) directly to the electrocoat (E.1) or (2.2) directly successive application of two or more basecoat materials (b.2.2.x) to the electrocoat (E.1), (3) producing a clearcoat (K) directly on (3.1) the basecoat (B.2.1) or (3.2) the topmost basecoat (B.2.2.x) by application of a clearcoat material (k) directly to (3.1) the basecoat (B.2.1) or (3.2) the topmost basecoat (B.2.2.x), (4) jointly curing the (4.1) basecoat (B.2.1) and the clearcoat (K) or (4.2) the basecoats (B.2.2.x) and the clearcoat (K), wherein the basecoat material (b.2.1) or at least one of the basecoat materials (b.2.2.x) comprises at least one aqueous dispersion (wD), the dispersion (wD) comprising at least one polymer having a particle size of 100 to 500 nm and produced by successive radical emulsion polymerization of three mixtures (A), (B), and (C) of olefinically unsaturated monomers, the mixture (A) comprising at least 50 wt % of monomers having a solubility in water of less than 0.5 g/l at 25° C., and a polymer prepared from the mixture (A) possessing a glass transition temperature of 10 to 65° C., the mixture (B) comprising at least one polyunsaturated monomer, and a polymer prepared from the mixture (B) possessing a glass transition temperature of −35 to 15° C., and a polymer prepared from the mixture (C) possessing a glass transition temperature of −50 to 15° C., and i. first mixture (A) being polymerized, ii. then mixture (B) being polymerized in the presence of the polymer prepared under i., and iii. thereafter mixture (C) being polymerized in the presence of the polymer prepared under ii.

The method specified above is also referred to below as method of the invention and is correspondingly a subject of the present invention. Preferred embodiments of the method of the invention are apparent from the description hereinafter and from the dependent claims.

A further subject of the present invention is a multicoat paint system produced by means of the method of the invention.

The method of the invention allows multicoat paint systems to be produced without a separate curing step for the coating produced directly on the electrocoat. For greater ease of comprehension, this coating for the purposes of the present invention is referred to as basecoat. Instead of separate curing, this basecoat is jointly cured together with optionally further basecoats beneath the clearcoat, and with the clearcoat. In spite of this, multicoat paint systems having outstanding technological applications properties, more particularly esthetic properties, result from the application of the method of the invention.

DETAILED DESCRIPTION

Figure 1:
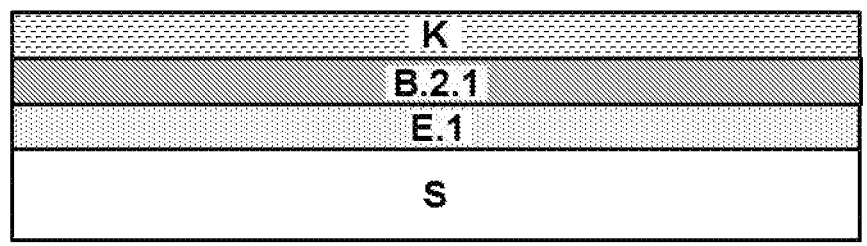
FIG. 1 depicts a schematic construction of a multicoat paint system of the invention (M), disposed on a metallic substrate (S), comprising a cured electrocoat (E.1) and also a basecoat (B.2.1) and a clearcoat (K) which have been jointly cured.

First of all a number of terms used in the context of the present invention will be explained.

The application of a coating material to a substrate, and the production of a coating film on a substrate, are understood as follows. The coating material in question is applied such that the coating film produced therefrom is disposed on the substrate, but need not necessarily be in direct contact with the substrate. For example, between the coating film and the substrate, there may be other coats disposed. In stage (1), for example, the cured electrocoat (E.1) is produced on the metallic substrate (S), but between the substrate and the electrocoat there may also be a conversion coating disposed, as described later on below, such as a zinc phosphate coat.

The same principle applies to the application of a coating material (b) to a coating film (A) produced by means of another coating material (a), and to the production of a coating film (B) on another coating film (A). The coating film (B) need not necessarily be in contact with the coating film (A), being required merely to be disposed above it, in other words on the side of the coating film (A) that is remote from the substrate.

In contrast to this, the application of a coating material directly to a substrate, or the production of a coating film directly on a substrate, is understood as follows. The coating material in question is applied such that the coating film produced therefrom is disposed on the substrate and is in direct contact with the substrate. In particular, therefore, there is no other coat disposed between coating film and substrate.

The same applies, of course, to the application of a coating material (b) directly to a coating film (A) produced by means of another coating material (a), and to the production of a coating film (B) directly on another coating film (A). In this case the two coating films are in direct contact, being therefore disposed directly on one another. In particular there is no further coat between the coating films (A) and (B). The same principle of course applies to directly successive application of coating materials and to the production of directly successive coating films.

Flashing, interim drying, and curing are understood in the context of the present invention to have the same semantic content as that familiar to the skilled person in connection with methods for producing multicoat paint systems.

The term "flashing" is understood accordingly in principle as a designation for the passive or active evaporation of organic solvents and/or water from a coating material applied as part of the production of a paint system, usually at ambient temperature (that is, room temperature), 15 to 35° C. for example, for a duration of 0.5 to 30 minutes, for example. Flashing is accompanied therefore by evaporation of organic solvents and/or water present in the applied coating material. Since the coating material is still fluid, at any rate directly after application and at the beginning of flashing, it may flow in the course of flashing. The reason is that at least one coating material applied by spray application is applied generally in the form of droplets and not in a uniform thickness. As a result of the organic solvents and/or water it comprises, however, the material is fluid and may therefore undergo flow to form a homogeneous, smooth coating film. At the same time, there is successive evaporation of organic solvents and/or water, resulting after the flashing phase in a comparatively smooth coating film, which comprises less water and/or solvent in comparison with the applied coating material. After flashing, however, the coating film is not yet in the service-ready state. While it is no longer flowable, for example, it is still soft and/or tacky, and possibly is only partly dried. In particular, the coating film is not yet cured as described later on below.

Interim drying is thus understood likewise to refer to the passive or active evaporation of organic solvents and/or water from a coating material applied as part of the production of a paint system, usually at a temperature increased relative to the ambient temperature and amounting, for example, to 40 to 90° C., for a duration of 1 to 60 minutes, for example. In the course of interim drying as well, therefore, the applied coating material will lose a fraction of organic solvents and/or water. Based on a particular coating material, the general rule is that interim drying, by comparison with flashing, proceeds for example at higher temperatures and/or for a longer time period, meaning that, by comparison with flashing, there is also a higher fraction of organic solvents and/or water that escapes from the applied coating film. Even interim drying, however, does not result in a coating film in the service-ready state, in other words not a cured coating film as described later on below. A typical sequence of flashing and interim drying would be, for example, the flashing of an applied coating film at ambient temperature for 3 minutes and then its interim drying at 60° C. for 10 minutes. A conclusive delimitation of the two concepts from one another, however, is neither necessary nor desirable. For the sake of pure comprehension, these terms are used in order to make it clear that variable and sequential conditioning of a coating film can take place, prior to the curing described below. Here, depending on the coating material, the evaporation temperature and evaporation time, greater or lesser fractions of the organic solvents and/or water present in the coating material may evaporate. It is even possible here, optionally, for a fraction of the polymers present as binders in the coating material to undergo crosslinking or interlooping with one another as described below. Both in flashing and in interim drying, however, the kind of service-ready coating film that is the case for the curing described below is not obtained. Accordingly, curing is unambiguously delimited from flashing and interim drying.

The curing of a coating film is understood accordingly to be the conversion of such a film into the service-ready state, in other words into a state in which the substrate furnished with the coating film in question can be transported, stored, and used in its intended manner. A cured coating film, then, is in particular no longer soft or tacky, but instead is conditioned as a solid coating film which, even on further exposure to curing conditions as described later on below, no longer exhibits any substantial change in its properties such as hardness or adhesion to the substrate.

As is known, coating materials may in principle be cured physically and/or chemically, depending on components present such as binders and crosslinking agents. In the case of chemical curing, consideration is given to thermochemical curing and actinic-chemical curing. Where, for example, a coating material is thermochemically curable, it may be self-crosslinking and/or externally crosslinking. The indication that a coating material is self-crosslinking and/or externally crosslinking means, in the context of the present invention, that this coating material comprises polymers as binders and optionally crosslinking agents that are able to crosslink with one another correspondingly. The parent mechanisms and also binders and crosslinking agents (film-forming components) that can be used are described later on below.

In the context of the present invention, "physically curable" or the term "physical curing" means the formation of a cured coating film by loss of solvent from polymer solutions or polymer dispersions, with the curing being achieved by interlooping of polymer chains. Coating materials of these kinds are generally formulated as one-component coating materials.

In the context of the present invention, "thermochemically curable" or the term "thermochemical curing" means the crosslinking of a coating film (formation of a cured coating film) initiated by chemical reaction of reactive functional groups, where the energetic activation of this chemical reaction is possible through thermal energy. Different functional groups which are complementary to one another can react with one another here (complementary functional groups), and/or the formation of the cured coat is based on the reaction of autoreactive groups, in other words functional groups which react among one another with groups of their own kind. Examples of suitable complementary reactive functional groups and autoreactive functional groups are known from German patent application DE 199 30 665 A1, page 7, line 28, to page 9, line 24, for example.

This crosslinking may be self-crosslinking and/or external crosslinking. Where, for example, the complementary reactive functional groups are already present in an organic polymer used as binder, as for example in a polyester, a polyurethane, or a poly-(meth)acrylate, self-crosslinking occurs. External crosslinking occurs, for example, when a (first) organic polymer containing certain functional groups, hydroxyl groups for example, reacts with a crosslinking agent known per se, as for example with a polyisocyanate and/or a melamine resin. The crosslinking agent, then, contains reactive functional groups which are complementary to the reactive functional groups present in the (first) organic polymer used as binder.

In the case of external crosslinking in particular, the one-component and multicomponent systems, more particularly two-component systems, that are known per se are contemplated.

In thermochemically curable one-component systems, the components for crosslinking, as for example organic polymers as binders and crosslinking agents, are present alongside one another, in other words in one component. A requirement for this is that the components to be crosslinked react with one another—that is, enter into curing reactions—only at relatively high temperatures of more than 100° C., for example. Otherwise it would be necessary to store the components for crosslinking separately from one another and to mix them with one another only shortly before application to a substrate, in order to prevent premature at least proportional thermochemical curing (compare two-component systems). As an exemplary combination, mention may be made of hydroxy-functional polyesters and/or polyurethanes with melamine resins and/or blocked polyisocyanates as crosslinking agents.

In thermochemically curable two-component systems, the components that are to be crosslinked, as for example the organic polymers as binders and the crosslinking agents, are present separately from one another in at least two components, which are not combined until shortly before application. This form is selected when the components for crosslinking undergo reaction with one another even at ambient temperatures or slightly elevated temperatures of 40 to 90° C., for example. As an exemplary combination, mention may be made of hydroxy-functional polyesters and/or polyurethanes and/or poly(meth)acrylates with free polyisocyanates as crosslinking agent.

It is also possible for an organic polymer as binder to have both self-crosslinking and externally crosslinking functional groups, and to be then combined with crosslinking agents.

In the context of the present invention, "actinic-chemically curable", or the term "actinic-chemical curing", refers to the fact that the curing is possible with application of actinic radiation, this being electromagnetic radiation such as near infrared (NIR) and UV radiation, more particularly UV radiation, and also particulate radiation such as electron beams for curing. The curing by UV radiation is initiated customarily by radical or cationic photoinitiators. Typical actinically curable functional groups are carbon-carbon double bonds, with radical photoinitiators generally being employed in that case. Actinic curing, then, is likewise based on chemical crosslinking.

Of course, in the curing of a coating material identified as chemically curable, there will always be physical curing as well, in other words the interlooping of polymer chains. The physical curing may even be predominant. Provided it includes at least a proportion of film-forming components that are chemically curable, nevertheless, a coating material of this kind is identified as chemically curable.

It follows from the above that according to the nature of the coating material and the components it comprises, curing is brought about by different mechanisms, which of course also necessitate different conditions at the curing stage, more particularly different curing temperatures and curing times.

In the case of a purely physically curing coating material, curing takes place preferably between 15 and 90° C. over a period of 2 to 48 hours. In this case, then, the curing differs from the flashing and/or interim drying, where appropriate, solely in the duration of the conditioning of the coating film. Differentiation between flashing and interim drying, moreover, is not sensible. It would be possible, for example, for a coating film produced by application of a physically curable coating material to be subjected to flashing or interim drying first of all at 15 to 35° C. for a duration of 0.5 to 30 minutes, for example, and then to be cured at 50° C. for a duration of 5 hours.

Preferably, however, at least some of the coating materials for use in the context of the method of the invention, in other words electrocoat materials, aqueous basecoat materials, and clearcoat materials, are thermochemically curable, and especially preferably are thermochemically curable and externally crosslinking.

In principle, and in the context of the present invention, the curing of thermochemically curable one-component systems is carried out preferably at temperatures of 100 to 250° C., preferably 100 to 180° C., for a duration of 5 to 60 minutes, preferably 10 to 45 minutes, since these conditions are generally necessary in order for chemical crosslinking reactions to convert the coating film into a cured coating film. Accordingly it is the case that a flashing and/or interim drying phase taking place prior to curing takes place at lower temperatures and/or for shorter times. In such a case, for example, flashing may take place at 15 to 35° C. for a duration of 0.5 to 30 minutes, for example, and/or interim drying may take place at a temperature of 40 to 90° C., for example, for a duration of 1 to 60 minutes, for example.

In principle, and in the context of the present invention, the curing of thermochemically curable two-component systems is carried out at temperatures of 15 to 90° C., for example, in particular 40 to 90° C., for a duration of 5 to 80 minutes, preferably 10 to 50 minutes. Accordingly it is the case that a flashing and/or interim drying phase occurring prior to curing takes place at lower temperatures and/or for shorter times. In such a case, for example, it is no longer sensible to make any distinction between the concepts of flashing and interim drying. A flashing or interim drying phase which precedes curing may take place, for example, at 15 to 35° C. for a duration of 0.5 to 30 minutes, for example, but at any rate at lower temperatures and/or for shorter times than the curing that then follows.

This of course is not to rule out a thermochemically curable two-component system being cured at higher temperatures. For example, in step (4) of the method of the invention as described with more precision later on below, a basecoat film or two or more basecoat films are cured jointly with a clearcoat film. Where both thermochemically curable one-component systems and two-component systems are present within the films, such as a one-component basecoat material and a two-component clearcoat material, for example, the joint curing is of course guided by the curing conditions that are necessary for the one-component system.

All temperatures elucidated in the context of the present invention should be understood as the temperature of the room in which the coated substrate is located. It does not mean, therefore, that the substrate itself is required to have the temperature in question.

The measurement methods to be employed in the context of the present invention for determining certain characteristic variables are evident from the Examples section. Unless explicitly indicated otherwise, these measurement methods are to be used for determining the respect characteristic variable.

Where reference is made in the context of the present invention to an official standard, without indication of the official validity period, the reference is of course to the version of the standard valid on the filing date or, if there is no valid version at that date, the most recent valid version.

The Method of the Invention

In the method of the invention, a multicoat paint system is built up on a metallic substrate (S).

Metallic substrates (S) contemplated essentially include substrates comprising or consisting of, for example, iron, aluminum, copper, zinc, magnesium, and alloys thereof, and also steel, in any of a very wide variety of forms and compositions. Preferred substrates are those of iron and steel, examples being typical iron and steel substrates as used in the automobile industry sector. The substrates themselves may be of whatever shape—that is, they may be, for example, simple metal panels or else complex components such as, in particular, automobile bodies and parts thereof.

Before stage (1) of the method of the invention, the metallic substrates (S) may be pretreated in a conventional way—that is, for example, cleaned and/or provided with known conversion coatings. Cleaning may be accomplished mechanically, for example, by means of wiping, sanding and/or polishing, and/or chemically by means of pickling methods, by incipient etching in acid or alkali baths, by means of hydrochloric or sulfuric acid, for example. Cleaning with organic solvents or aqueous cleaners is of course also possible. Pretreatment may likewise take place by application of conversion coatings, more particularly by means of phosphating and/or chromating, preferably phosphating. In any case, the metallic substrates are preferably conversion-coated, more particularly phosphatized, preferably provided with a zinc phosphate coat.

In stage (1) of the method of the invention, electrophoretic application of an electrocoat material (e.1) to the substrate (S) and subsequent curing of the electrocoat material (e.1) are used to produce a cured electrocoat (E.1) on the metallic substrate (S).

The electrocoat material (e.1) used in stage (1) of the method of the invention may be a cathodic or anodic electrocoat material. Preferably it is a cathodic electrocoat material. Electrocoat materials have long been known to the skilled person. They are aqueous coating materials which must be suitable for electrophoretic application to a metallic substrate.

They comprise at any rate anionic or cationic polymers as binders. These polymers contain functional groups which are potentially anionic, meaning that they can be converted into anionic groups, carboxylic acid groups for example, or contain functional groups which are potentially cationic, meaning that they can be converted into cationic groups, amino groups for example. Conversion into charged groups is achieved generally through the use of corresponding neutralizing agents (organic amines (anionic), organic carboxylic acids such as formic acid (cationic)), with the anionic or cationic polymers then being produced as a result. The electrocoat materials generally and hence preferably further comprise typical anticorrosion pigments. The cathodic electrocoat materials that are preferred in the invention preferably comprise cationic polymers as binders, more particularly hydroxy-functional polyetheramines, which preferably have aromatic structural units. Such polymers are generally obtained by reaction of corresponding bisphenol-based epoxy resins with amines such as mono- and dialkylamines, alkanolamines and/or dialkylamino-alkylamines, for example. These polymers are used more particularly in combination with conventional blocked polyisocyanates. Reference may be made, by way of example, to the electrocoat materials described in WO 9833835 A1, WO 9316139 A1, WO 0102498 A1, and WO 2004018580 A1.

The electrocoat material (e.1) is therefore preferably an at any rate thermochemically curable coating material, and more particularly it is externally crosslinking. Preferably the electrocoat material (e.1) is a thermochemically curable one-component coating material. The electrocoat material (e.1) preferably comprises a hydroxy-functional epoxy resin as binder and a fully blocked polyisocyanate as crosslinking agent. The epoxy resin is preferably cathodic, more particularly containing amino groups.

Also known is the electrophoretic application of an electrocoat material (e.1) of this kind that takes place in stage (1) of the method of the invention. Application proceeds electrophoretically. This means that first of all the metallic workpiece for coating is immersed into a dipping bath comprising the coating material, and an electrical direct-current field is applied between the metallic workpiece and a counterelectrode. The workpiece therefore serves as the electrode; because of the described charge on the polymers used as binders, the nonvolatile constituents of the electrocoat material migrate through the electrical field to the substrate and are deposited on the substrate, producing an electrocoat film. In the case of a cathodic electrocoat material, for example, the substrate is connected accordingly as the cathode, and the hydroxide ions that form there as a result of the electrolysis of water carry out neutralization of the cationic binder, causing it to be deposited on the substrate and an electrocoat film to be formed. The method is therefore one of application by electrophoretic deposition.

Following the application of the electrocoat material (e.1), the coated substrate (S) is removed from the tank, optionally rinsed with water-based rinsing solutions, for example, then optionally subjected to flashing and/or interim drying, and lastly the applied electrocoat material is cured.

The applied electrocoat material (e.1) (or the applied, as yet uncured electrocoat film) is subjected to flashing at 15 to 35° C., for example, for a duration of 0.5 to 30 minutes, for example, and/or to interim drying at a temperature of preferably 40 to 90° C. for a duration of 1 to 60 minutes, for example.

The electrocoat material (e.1) applied to the substrate (or the applied, as yet uncured electrocoat film) is cured preferably at temperatures of 100 to 250° C., preferably 140 to 220° C., for a duration of 5 to 60 minutes, preferably 10 to 45 minutes, thereby producing the cured electrocoat (E.1).

The flashing, interim-drying, and curing conditions stated apply in particular to the preferred case where the electrocoat material (e.1) comprises a thermochemically curable one-component coating material as described above. This, however, does not rule out the electrocoat material being an otherwise-curable coating material and/or the use of different flashing, interim-drying, and curing conditions.

The film thickness of the cured electrocoat is, for example, 10 to 40 micrometers, preferably 15 to 25 micrometers. All film thicknesses reported in the context of the present invention should be understood as dry film thicknesses. It is therefore the thickness of the cured film in each case. Hence, where it is reported that a coating material is applied at a particular film thickness, this means that the coating material is applied in such a way as to result in the stated film thickness after curing.

In stage (2) of the method of the invention, (2.1) a basecoat film (B.2.1) is produced, or (2.2) two or more directly successive basecoat films (B.2.2.x) are produced. The films are produced by application (2.1) of an aqueous basecoat material (b.2.1) directly to the cured electrocoat (E.1), or by (2.2) directly successive application of two or more basecoat materials (b.2.2.x) to the cured electrocoat (E.1).

The directly successive application of two or more basecoat materials (b.2.2.x) to the cured electrocoat (E.1) therefore means that first of all a first basecoat material is applied directly to the electrocoat and thereafter a second basecoat material is applied directly to the film of the first basecoat material. An optional third basecoat material is then applied directly to the film of the second basecoat material. This procedure can then be repeated analogously for further basecoat materials (i.e., a fourth, fifth, etc. basecoat material).

After having been produced, therefore, the basecoat film (B.2.1) or the first basecoat film (B.2.2.x) is disposed directly on the cured electrocoat (E.1).

The terms basecoat material and basecoat film, in relation to the coating materials applied and coating films produced in stage (2) of the method of the invention, are used for greater ease of comprehension. The basecoat films (B.2.1) and (B.2.2.x) are not cured separately, but are instead cured jointly with the clearcoat material. Curing therefore takes place in analogy to the curing of basecoat materials employed in the standard process described in the introduction. In particular, the coating materials used in stage (2) of the method of the invention are not cured separately like the coating materials identified as surfacers in the standard process.

The aqueous basecoat material (b.2.1) used in stage (2.1) is described in detail later on below. In a first preferred embodiment, however, it is at any rate thermochemically curable, and with more particular preference is externally crosslinking. The basecoat material (b.2.1) here is preferably a one-component coating material. The basecoat material (b.2.1) here preferably comprises a combination of at least one hydroxy-functional polymer as binder, selected from the group consisting of polyacrylates (for example, hydroxyl-functional polymer comprising a dispersion (wD)), polyurethanes, polyesters, and copolymers of said polymers, examples being polyurethane-polyacrylates, and also of at least one melamine resin as crosslinking agent.

Equally possible depending on the sector of use, and hence a second preferred embodiment, however, is the use of basecoat materials (b.2.1) which comprise only small amounts of less than 5 wt %, preferably less than 2.5 wt %, based on the total weight of the basecoat material, of crosslinking agents such as, in particular, melamine resins. Further preferred in this embodiment is for there to be no crosslinking agents present at all. In spite of this, an outstanding quality is achieved within the overall construction. An advantage of not using crosslinking agents, and of the consequently lower complexity of the coating material, lies in the increase in the formulating freedom for the basecoat material. The shelf life as well may be better, owing to the avoidance of possible reactions on the part of the reactive components.

The basecoat material (b.2.1) may be applied by the methods known to the skilled person for applying liquid coating materials, as for example by dipping, knifecoating, spraying, rolling, or the like. Preference is given to employing spray application methods, such as, for example, compressed air spraying (pneumatic application), airless spraying, high-speed rotation, electrostatic spray application (ESTA), optionally in conjunction with hot spray application such as hot air (hot spraying), for example. With very particular preference the basecoat material (b.2.1) is applied via pneumatic spray application or electrostatic spray application. Application of the basecoat material (b.2.1) accordingly produces a basecoat film (B.2.1), in other words a film of the basecoat material (b.2.1) that is applied directly on the electrocoat (E.1).

Following application, the applied basecoat material (b.2.1) or the corresponding basecoat film (B.2.1) is subjected to flashing at 15 to 35° C., for example, for a duration of 0.5 to 30 minutes, for example, and/or to interim drying at a temperature of preferably 40 to 90° C. for a duration of 1 to 60 minutes, for example. Preference is given to flashing initially at 15 to 35° C. for a duration of 0.5 to 30 minutes, followed by interim drying at 40 to 90° C. for a duration of 1 to 60 minutes, for example. The flashing and interim-drying conditions described are applicable in particular to the preferred case where the basecoat material (b.2.1) is a thermochemically curable one-component coating material. This does not, however, rule out the basecoat material (b.2.1) being an otherwise-curable coating material, and/or the use of different flashing and/or interim-drying conditions.

Within stage (2) of the method of the invention, the basecoat film (B.2.1) is not cured, i.e., is preferably not exposed to temperatures of more than 100° C. for a duration of longer than 1 minute, and more preferably is not exposed at all to temperatures of more than 100° C. This is a direct and clear consequence of stage (4) of the method of the invention, which is described later on below. Since the basecoat film is cured only in stage (4), it cannot already be cured in stage (2), since in that case curing in stage (4) would no longer be possible.

The aqueous basecoat materials (b.2.2.x) used in stage (2.2) of the method of the invention are also described in detail later below. In a first preferred embodiment, at least one of the basecoat materials used in stage (2.2) is at any rate thermochemically curable, and with more particular preference is externally crosslinking. More preferably this is so for all basecoat materials (b.2.2.x). Preference here is given to at least one basecoat material (b.2.2.x) being a one-component coating material, and even more preferably this is the case for all basecoat materials (b.2.2.x). Preferably here at least one of the basecoat materials (b.2.2.x) comprises a combination of at least one hydroxy-functional polymer as binder, selected from the group consisting of polyacrylates (for example, a hydroxy-functional polymer comprising a dispersion (wD)), polyurethanes, polyesters and copolymers of the stated polymers, as for example polyurethane-polyacrylates, and also of at least one melamine resin as crosslinking agent. More preferably this is the case for all basecoat materials (b.2.2.x).

Also possible and hence likewise a preferred embodiment, depending on area of application, however, is to use at least one basecoat material (b.2.2.x) which comprises only small amounts of less than 5 wt %, preferably less than 2.5 wt %, of crosslinking agents such as melamine resins in particular, based on the total weight of the basecoat material. Even more preferred in this embodiment is for there to be no crosslinking agents included at all. The aforesaid applies preferably to all of the basecoat materials (b.2.2.x) used. In spite of this, an outstanding quality is achieved in the overall system. Other advantages are freedom in formulation and stability in storage.

Basecoat materials (b.2.2.x) can be applied by the methods known to the skilled person for applying liquid coating materials, such as by dipping, knifecoating, spraying, rolling or the like, for example. Preference is given to employing spray application methods, such as, for example, compressed air spraying (pneumatic application), airless spraying, high-speed rotation, electrostatic spray application (ESTA), optionally in conjunction with hot spray application such as hot air (hot spraying), for example. With very particular preference the basecoat materials (b.2.2.x) are applied via pneumatic spray application and/or electrostatic spray application.

In stage (2.2) of the method of the invention, the following designation is appropriate. The basecoat materials and basecoat films are labeled generally as (b.2.2.x) and (B.2.2.x), whereas the x may be replaced by other letters which match accordingly when designating the specific individual basecoat materials and basecoat films.

The first basecoat material and the first basecoat film may be labeled with a; the topmost basecoat material and the topmost basecoat film may be labeled with z. These two basecoat materials and basecoat films are present in any case in stage (2.2). Any films between them may be given serial labeling as b, c, d and so on.

Through the application of the first basecoat material (b.2.2.a), accordingly, a basecoat film (B.2.2.a) is produced directly on the cured electrocoat (E.1). The at least one further basecoat film (B.2.2.x) is then produced directly on the basecoat film (B.2.2.a). Where two or more further basecoat films (B.2.2.x) are produced, they are produced in direct succession. For example, there may be exactly one further basecoat film (B.2.2.x) produced, in which case this film is disposed directly beneath the clearcoat film (K) in the multicoat paint system ultimately produced, and may therefore be termed basecoat film (B.2.2.z) (see also FIG. 2). Also possible, for example, is the production of two further basecoat films (B.2.2.x), in which case the film produced directly on the basecoat (B.2.2.a) may be designated as (B.2.2.b), and the film arranged lastly directly beneath the clearcoat film (K) may be designated in turn as (B.2.2.z) (see also FIG. 3).

The basecoat material (b.2.2.x) may be identical or different. It is also possible to produce two or more basecoat films (B.2.2.x) with the same basecoat material, and one or more further basecoat films (B.2.2.x) with one or more other basecoat materials.

The basecoat materials (b.2.2.x) applied are generally subjected, individually and/or with one another, to flashing and/or interim drying. In stage (2.2), preferably, flashing takes place at 15 to 35° C. for a duration of 0.5 to 30 min and interim drying takes place at 40 to 90° C. for a duration of 1 to 60 min, for example. The sequence of flashing and/or interim drying of individual or of two or more basecoat films (B.2.2.x) may be adapted according to the requirements of the case in hand. The above-described preferred flashing and interim-drying conditions apply particularly to the preferred case wherein at least one basecoat material (b.2.2.x), preferably all basecoat materials (b.2.2.x), comprises thermochemically curable one-component coating materials. This does not rule out, however, the basecoat materials (b.2.2.x) being coating materials which are curable in a different way, and/or the use of different flashing and/or interim-drying conditions.

If a first basecoat film is produced by applying a first basecoat material and a further basecoat film is produced by applying the same basecoat material, then obviously both films are based on the same basecoat material. But application, obviously, takes place in two stages, meaning that the basecoat material in question, in the sense of the method of the invention, corresponds to a first basecoat material (b.2.2.a) and a further basecoat material (b.2.2.z). The system described is also frequently referred to as a one-coat basecoat film system produced in two applications. Since, however, especially in real-life production-line (OEM) finishing, the technical circumstances in a finishing line always dictate a certain time span between the first application and the second application, during which the substrate, the automobile body, for example, is conditioned at 15 to 35° C., for example, and thereby flashed, it is formally clearer to characterize this system as a two-coat basecoat system. The operating regime described should therefore be assigned to the second variant of the method of the invention.

A number of preferred variants of the basecoat film sequences for the basecoat materials (b.2.2.x) may be elucidated as follows.

It is possible to produce a first basecoat film by, for example, electrostatic spray application (ESTA) or pneumatic application of a first basecoat material directly on the cured electrocoat, to carry out flashing and/or interim drying thereon as described above, and subsequently to produce a second basecoat film by direct application of a second basecoat material, different from the first basecoat material. The second basecoat material may also be applied by electrostatic spray application or by pneumatic application, thereby producing a second basecoat film directly on the first basecoat film. Between and/or after the applications it is of course possible to carry out flashing and/or interim drying again. This variant of stage (2.2) is selected preferably when first of all a color-preparatory basecoat film, as described in more detail later on below, is to be produced directly on the electrocoat, and then a color- and/or effect-imparting basecoat film, as described in more detail later on below, is to be produced directly on the first basecoat film. The first basecoat film in that case is based on the color-preparatory basecoat material, the second basecoat film on the color- and/or effect-imparting basecoat material. It is likewise possible, for example, to apply this second basecoat material as described above in two stages, thereby forming two further, directly successive basecoat films, both based on the same basecoat material, directly on the first basecoat film.

It is likewise possible for three basecoat films to be produced in direct succession directly on the cured electrocoat, with the basecoat films being based on three different basecoat materials. For example, a color-preparatory basecoat film, a further film based on a color- and/or effect-imparting basecoat material, and a further film based on a second color- and/or effect-imparting basecoat material may be produced. Between and/or after the individual applications and/or after all three applications, it is possible in turn to carry out flashing and/or interim drying.

Embodiments preferred in the context of the present invention therefore comprise the production in stage (2.2) of the method of the invention of two or three basecoat films. In that case it is preferred for the basecoat film produced directly on the cured electrocoat to be based on a color-preparatory basecoat material. The second and any third film are based either on one and the same color- and/or effect-imparting basecoat material, or on a first color- and/or effect-imparting basecoat material and on a different second color- and/or effect-imparting basecoat material.

Within stage (2) of the method of the invention, the basecoat films (B.2.2.x) are not cured—that is, they are preferably not exposed to temperatures of more than 100° C. for a duration of longer than 1 minute, and preferably not to temperatures of more than 100° C. at all. This is evident clearly and directly from stage (4) of the method of the invention, described later on below. Because the basecoat films are cured only in stage (4), they cannot be already cured in stage (2), since in that case the curing in stage (4) would no longer be possible.

The basecoat materials (b.2.1) and (b.2.2.x) are applied such that the basecoat film (B.2.1), and the individual basecoat films (B.2.2.x), after the curing has taken place in stage (4), have a film thickness of, for example, 5 to 50 micrometers, preferably 6 to 40 micrometers, especially preferably 7 to 35 micrometers. In stage (2.1), preference is given to production of higher film thicknesses of 15 to 50 micrometers, preferably 20 to 45 micrometers. In stage (2.2), the individual basecoat films tend to have lower film thicknesses by comparison, the overall system then again having film thicknesses which lie within the order of magnitude of the one basecoat film (B.2.1). In the case of two basecoat films, for example, the first basecoat film (B.2.2.a) preferably has film thicknesses of 5 to 35, more particularly 10 to 30, micrometers, and the second basecoat film (B.2.2.z) preferably has film thicknesses of 5 to 35 micrometers, more particularly 10 to 30 micrometers, with the overall film thickness not exceeding 50 micrometers.

In stage (3) of the method of the invention, a clearcoat film (K) is produced directly (3.1) on the basecoat film (B.2.1) or (3.2) on the topmost basecoat film (B.2.2.z). This production is accomplished by corresponding application of a clearcoat material (k).

The clearcoat material (k) may be any desired transparent coating material known in this sense to the skilled person. "Transparent" means that a film formed with the coating material is not opaquely colored, but instead has a constitution such that the color of the underlying basecoat system is visible. As is known, however, this does not rule out the possible inclusion, in minor amounts, of pigments in a clearcoat material, such pigments possibly supporting the depth of color of the overall system, for example.

The coating materials in question are aqueous or solvent-containing transparent coating materials, which may be formulated not only as one-component but also as two-component or multicomponent coating materials. Also suitable, furthermore, are powder slurry clearcoat materials. Solventborne clearcoat materials are preferred.

The clearcoat materials (k) used may in particular be thermochemically curable and/or actinic-chemically curable. In particular they are thermochemically curable and externally crosslinking.

Typically and preferably, therefore, the clearcoat materials comprise at least one (first) polymer as binder, having functional groups, and at least one crosslinker having a functionality complementary to the functional groups of the binder. With preference at least one hydroxy-functional poly(meth)acrylate polymer is used as binder, and a free polyisocyanate as crosslinking agent.

Suitable clearcoat materials are described in, for example, WO 2006042585 A1, WO 2009077182 A1, or else WO 2008074490 A1.

The clearcoat material (k) is applied by the methods known to the skilled person for applying liquid coating materials, as for example by dipping, knifecoating, spraying, rolling, or the like. Preference is given to employing spray application methods, such as, for example, compressed air spraying (pneumatic application), and electrostatic spray application (ESTA).

The clearcoat material (k) or the corresponding clearcoat film (K) is subjected to flashing and/or interim-drying after application, preferably at 15 to 35° C. for a duration of 0.5 to 30 minutes. These flashing and interim-drying conditions apply in particular to the preferred case where the clearcoat material (k) comprises a thermochemically curable two-component coating material. But this does not rule out the clearcoat material (k) being an otherwise-curable coating material and/or other flashing and/or interim-drying conditions being used.

The clearcoat material (k) is applied in such a way that the clearcoat film after the curing has taken place in stage (4) has a film thickness of, for example, 15 to 80 micrometers, preferably 20 to 65 micrometers, especially preferably 25 to 60 micrometers.

In the method of the invention, of course, there is no exclusion of further coating materials, as for example further clearcoat materials, being applied after the application of the clearcoat material (k), and of further coating films, as for example further clearcoat films, being produced in this way. Such further coating films are then likewise cured in the stage (4) described below. Preferably, however, only the one clearcoat material (k) is applied, and is then cured as described in stage (4).

In stage (4) of the method of the invention there is joint curing (4.1) of the basecoat film (B.2.1) and of the clearcoat film (K) or (4.2) of the basecoat films (B.2.2.x) and of the clearcoat film (K).

The joint curing takes place preferably at temperatures of 100 to 250° C., preferably 100 to 180° C., for a duration of 5 to 60 minutes, preferably 10 to 45 minutes. These curing conditions apply in particular to the preferred case wherein the basecoat film (B.2.1) or at least one of the basecoat films (B.2.2.x), preferably all basecoat films (B.2.2.x), are based on a thermochemically curable one-component coating material. The reason is that, as described above, such conditions are generally required to achieve curing as described above for a one-component coating material of this kind. Where the clearcoat material (k), for example, is likewise a thermochemically curable one-component coating material, the corresponding clearcoat film (K) is of course likewise cured under these conditions. The same is evidently true of the preferred case wherein the clearcoat material (k) is a thermochemically curable two-component coating material.

The statements made above, however, do not rule out the basecoat materials (b.2.1) and (b.2.2.x) and also the clearcoat materials (k) being otherwise-curable coating materials and/or other curing conditions being used.

Figure 2:
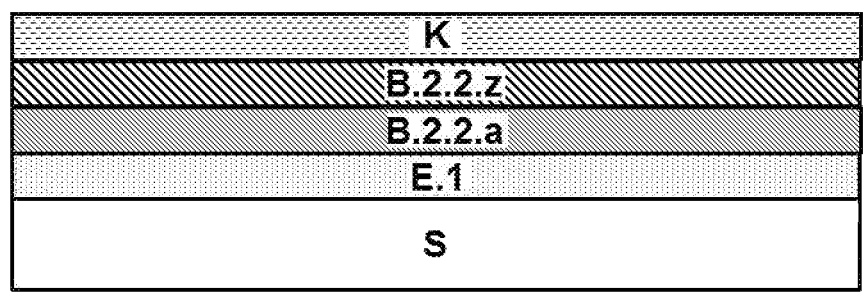
FIG. 2 depicts a schematic construction of a multicoat paint system of the invention (M), disposed on a metallic substrate (S), comprising a cured electrocoat (E.1), two basecoats (B.2.2.x), namely a first basecoat (B.2.2.a) and a topmost basecoat (B.2.2.z) arranged over it, and also a clearcoat (K), which have been jointly cured.
Figure 3:
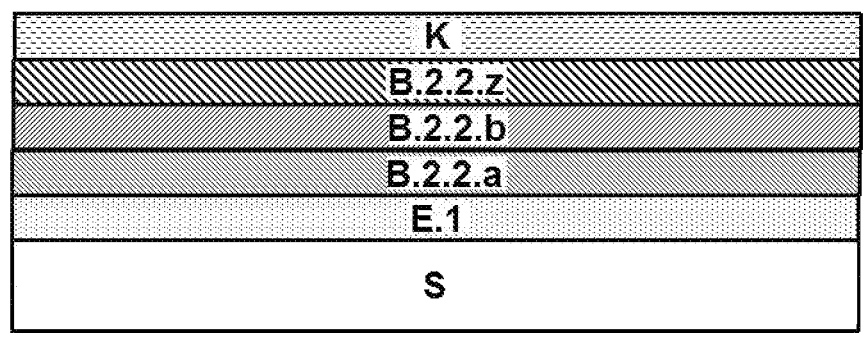
FIG. 3 depicts a schematic construction of a multicoat paint system of the invention (M), disposed on a metallic substrate (S), comprising a cured electrocoat (E.1), three basecoats (B.2.2.x), namely a first basecoat (B.2.2.a), a basecoat (B.2.2.b), and a topmost basecoat (B.2.2.z), arranged over it, and also a clearcoat (K), which have been jointly cured.

The result after the end of stage (4) of the method of the invention is a multicoat paint system of the invention (see also FIGS. 1 to 3).

The Basecoat Materials for Inventive Use

The basecoat material (b.2.1) for use in accordance with the invention comprises at least one, preferably precisely one, specific aqueous dispersion (wD) which comprises at least one, preferably precisely one, specific polymer.

An aqueous dispersion (wD) for inventive use comprises at least one specific polymer. A dispersion (wD) preferably comprises precisely one such polymer. The preparation of the polymer encompasses the successive radical emulsion polymerization of three mixtures (A), (B), and (C) of olefinically unsaturated monomers. The process is therefore a multistage radical emulsion polymerization, in which i. first of all the mixture (A) is polymerized, then ii. the mixture (B) is polymerized in the presence of the polymer prepared under i., and additionally iii. the mixture (C) is polymerized in the presence of the polymer prepared under ii. All three monomer mixtures are therefore polymerized via a radical emulsion polymerization conducted separately in each case (that is, a stage, or else polymerization stage), with these stages taking place in succession. In terms of time, the stages may take place directly one after another. It is equally possible for the corresponding reaction solution after the end of one stage to be stored for a certain time and/or transferred to a different reaction vessel, and only then for the next stage to take place. The preparation of the specific multistage polymer preferably comprises no further polymerization steps additional to the polymerization of the monomer mixtures (A), (B), and (C).

The concept of radical emulsion polymerization is familiar to the skilled person and is elucidated in greater precision again below, moreover.

In a polymerization of this kind, olefinically unsaturated monomers are polymerized in an aqueous medium, using at least one water-soluble initiator, and in the presence of at least one emulsifier.

Corresponding water-soluble initiators are likewise known. The at least one water-soluble initiator is preferably selected from the group consisting of potassium, sodium, or ammonium peroxodisulfate, hydrogen peroxide, tert-butyl hydroperoxide, 2,2'-azobis(2-amidoisopropane) dihydrochloride, 2,2'-azobis-(N,N'-dimethyleneisobutyramidine) dihydrochloride, 2,2'-azobis(4-cyanopentanoic acid), and mixtures of the aforementioned initiators, such as hydrogen peroxide and sodium persulfate, for example. Likewise members of the stated preferred group are the redox initiator systems that are known per se.

By redox initiator systems are meant in particular those initiators which comprise at least one peroxide-containing compound in combination with at least one redox coinitiator, examples being reductive sulfur compounds such as, for example, bisulfites, sulfites, thiosulfates, dithionites or tetrathionates of alkali metals and ammonium compounds, sodium hydroxy-methanesulfinate dihydrate and/or thiourea. Accordingly it is possible to use combinations of peroxodisulfates with alkali metal or ammonium hydrogensulfites, examples being ammonium peroxodisulfate and ammonium disulfite. The weight ratio of peroxide-containing compounds to the redox coinitiators is preferably 50:1 to 0.05:1.

In combination with the initiators it is possible additionally to use transition metal catalysts, such as salts of iron, nickel, cobalt, manganese, copper, vanadium, or chromium, for example, such as iron(II) sulfate, cobalt(II) chloride, nickel(II) sulfate, copper(I) chloride, manganese(II) acetate, vanadium(III) acetate, manganese(II) chloride. Based on the total mass of the olefinically unsaturated monomers used in a polymerization, these transition metal salts are employed customarily in amounts of 0.1 to 1000 ppm. Hence it is possible to use combinations of hydrogen peroxide with iron(II) salts, such as, for example, 0.5 to 30 wt % of hydrogen peroxide and 0.1 to 500 ppm of Mohr's salt, in which case the fractional ranges are based in each case on the total weight of the monomers used in the respective polymerization stage.

The initiators are used preferably in an amount of 0.05 to 20 wt %, preferably 0.05 to 10, more preferably from 0.1 to 5 wt %, based on the total weight of the monomers used in the respective polymerization stage.

An emulsion polymerization takes place within a reaction medium that comprises water as continuous medium and comprises the at least one emulsifier in the form of micelles. The polymerization is initiated by decomposition of the water-soluble initiator in the water. The growing polymer chain enters the emulsifier micelles, and the further polymerization then takes place in the micelles. In addition to the monomers, the at least one water-soluble initiator, and the at least one emulsifier, the reaction mixture therefore consists primarily of water. The stated components, namely monomers, water-soluble initiator, emulsifier, and water, preferably account for at least 95 wt % of the reaction mixture. The reaction mixture preferably consists of these components.

The at least one emulsifier is used preferably in an amount of 0.1-10 wt %, more preferably 0.1-5 wt %, very preferably 0.1-3 wt %, based in each case on the total weight of the monomers used in the respective polymerization stage.

Emulsifiers as well are known in principle. Use may be made of nonionic or ionic emulsifiers, including zwitterionic emulsifiers, and also, optionally, mixtures of the aforementioned emulsifiers.

Preferred emulsifiers are optionally ethoxylated and/or propoxylated alkanols having 10 to 40 carbon atom. They may have different degrees of ethoxylation and/or propoxylation (for example, adducts modified with poly(oxy)ethylene and/or poly(oxy)propylene chains consisting of 5 to 50 molecule units). Also possible for use are sulfated, sulfonated, or phosphated derivatives of the stated products. Such derivatives are generally employed in neutralized form.

Particularly preferred emulsifiers suitable are neutralized dialkylsulfosuccinic esters or alkyldi-phenyl oxide disulfonates, available commercially for example as EF-800 from Cytec.

The emulsion polymerizations are carried out usefully at a temperature of 0 to 160° C., preferably of 15 to 95° C., more preferably of 60 to 95° C.

It is preferred here to operate in the absence of oxygen, and preferably under an inert gas atmosphere. The polymerization is generally carried out under atmospheric pressure, although the application of lower pressures or higher pressures is also possible. Particularly if polymerization temperatures are employed which lie above the boiling point under atmospheric pressure of water, of the monomers used and/or of the organic solvents, it is usual to select higher pressures.

The individual polymerization stages in the preparation of the specific polymer may be carried out, for example, as what are called "starved feed" polymerizations (also known as "starve feed" or "starve fed" polymerizations).

A starved feed polymerization in the sense of the present invention is an emulsion polymerization in which the amount of free olefinically unsaturated monomers in the reaction solution (also called reaction mixture) is minimized throughout the reaction time. This means that the metered addition of the olefinically unsaturated monomers is such that over the entire reaction time the fraction of free monomers in the reaction solution does not exceed 6.0 wt %, preferably 5.0 wt %, more preferably 4.0 wt %, particularly advantageously 3.5 wt %, based in each case on the total amount of the monomers used in the respective polymerization stage. Further preferred within these structures are concentration ranges for the olefinically unsaturated monomers of 0.01 to 6.0 wt %, preferably 0.02 to 5.0 wt %, more preferably 0.03 to 4.0 wt %, more particularly 0.05 to 3.5 wt %. For example, the highest weight fraction detectable during the reaction may be 0.5 wt %, 1.0 wt %, 1.5 wt %, 2.0 wt %, 2.5 wt %, or 3.0 wt %, while all other values detected then lie below the values indicated here. The total amount (also called total weight) of the monomers used in the respective polymerization stage evidently corresponds for stage i. to the total amount of the monomer mixture (A), for stage ii. to the total amount of the monomer mixture (B), and for stage iii. to the total amount of the monomer mixture (C).

The concentration of the monomers in the reaction solution here may be determined by gas chromatography, for example. In that case a sample of the reaction solution is cooled with liquid nitrogen immediately after sampling, and 4-methoxyphenol is added as an inhibitor. In the next step, the sample is dissolved in tetrahydrofuran and then n-pentane is added in order to precipitate the polymer formed at the time of sampling.

The liquid phase (supernatant) is then analyzed by gas chromatography, using a polar column and an apolar column for determining the monomers, and a flame ionization detector. Typical parameters for the gas-chromatographic determination are as follows: 25 m silica capillary column with 5% phenyl-, 1% vinyl-methyl-polysiloxane phase, or 30 m silica capillary column with 50% phenyl-, 50% methyl-polysiloxane phase, carrier gas hydrogen, split injector 150° C., oven temperature 50 to 180° C., flame ionization detector, detector temperature 275° C., internal standard isobutyl acrylate. The concentration of the monomers is determined, for the purposes of the present invention, preferably by gas chromatography, more particularly in compliance with the parameters specified above.

The fraction of the free monomers can be controlled in various ways.

One possibility for keeping the fraction of the free monomers low is to select a very low metering rate for the mixture of the olefinically unsaturated monomers into the actual reaction solution wherein the monomers make contact with the initiator. If the metering rate is so low that all of the monomers are able to react virtually immediately when they are in the reaction solution, it is possible to ensure that the fraction of the free monomers is minimized.

In addition to the metering rate it is important that there are always sufficient radicals present in the reaction solution to allow each of the added monomers to react extremely quickly. In this way, further chain growth of the polymer is guaranteed and the fraction of free monomer is kept low.

For this purpose, the reaction conditions are preferably selected such that the initiator feed is commenced even before the start of the metering of the olefinically unsaturated monomers. The metering is preferably commenced at least 5 minutes beforehand, more preferably at least 10 minutes before. With preference at least 10 wt % of the initiator, more preferably at least 20 wt %, very preferably at least 30 wt % of the initiator, based in each case on the total amount of initiator, is added before the metering of the olefinically unsaturated monomers is commenced.

Preference is given to selecting a temperature which allows constant decomposition of the initiator.

The amount of initiator is likewise an important factor for the sufficient presence of radicals in the reaction solution. The amount of initiator should be selected such that at any given time there are sufficient radicals available, allowing the added monomers to react. If the amount of initiator is increased, it is also possible to react greater amounts of monomers at the same time.

A further factor determining the reaction rate is the reactivity of the monomers.

Control over the fraction of the free monomers can therefore be guided by the interplay of initiator quantity, rate of initiator addition, rate of monomer addition, and through the selection of the monomers. Not only a slowing-down of metering but also an increase in the initial quantity, and also the premature commencement of addition of the initiator, serve the aim of keeping the concentration of free monomers below the limits stated above.

At any point during the reaction, the concentration of the free monomers can be determined by gas chromatography, as described above.

Should this analysis find a concentration of free monomers that comes close to the limit in value for the starved feed polymerization, as a result, for example, of small fractions of highly reactive olefinically unsaturated monomers, the parameters referred to above can be utilized in order to control the reaction. In this case, for example, the metering rate of the monomers can be reduced, or the amount of initiator can be increased.

For the purposes of the present invention it is preferable for the polymerization stages ii. and iii. to be carried out under starved feed conditions. This has the advantage that the formation of new particle nuclei within these two polymerization stages is effectively minimized. Instead, the particles existing after stage i. (and therefore also called seed below) can be grown further in stage ii. by the polymerization of the monomer mixture B (therefore also called core below). It is likewise possible for the particles existing after stage ii. (also below called polymer comprising seed and core) to be grown further in stage iii. through the polymerization of the monomer mixture C (therefore also called shell below), resulting ultimately in a polymer comprising particles containing seed, core, and shell.

Stage i. as well can of course also be carried out under staved feed conditions.

The mixtures (A), (B), and (C) are mixtures of olefinically unsaturated monomers. Suitable olefinically unsaturated monomers may be mono- or polyolefinically unsaturated.

Described first of all below are monomers which can be used in principle and which are suitable across all mixtures (A), (B), and (C), and are monomers that are optionally preferred. Specific preferred embodiments of the individual mixtures will be addressed thereafter.

Examples of suitable monoolefinically unsaturated monomers include, in particular, (meth)acrylate-based monoolefinically unsaturated monomers, monoolefinically unsaturated monomers containing allyl groups, and other monoolefinically unsaturated monomers containing vinyl groups, such as vinylaromatic monomers, for example. The term (meth)acrylic or (meth)acrylate for the purposes of the present invention encompasses both methacrylates and acrylates. Preferred for use at any rate, although not necessarily exclusively, are (meth)acrylate-based monoolefinically unsaturated monomers.

(Meth)acrylate-based, monoolefinically unsaturated monomers may be, for example, (meth)acrylic acid and esters, nitriles, or amides of (meth)acrylic acid.

Preference is given to esters of (meth)acrylic acid having a non-olefinically unsaturated radical R.

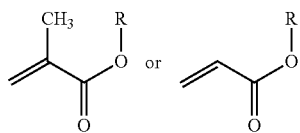

The radical R may be saturated aliphatic, aromatic, or mixed saturated aliphatic-aromatic. Aliphatic radicals for the purposes of the present invention are all organic radicals which are not aromatic. Preferably the radical R is aliphatic.

The saturated aliphatic radical may be a pure hydrocarbon radical or it may include heteroatoms from bridging groups (for example, oxygen from ether groups or ester groups) and/or may be substituted by functional groups containing heteroatoms (alcohol groups, for example). For the purposes of the present invention, therefore, a clear distinction is made between bridging groups containing heteroatoms and functional groups containing heteroatoms (that is, terminal functional groups containing heteroatoms).

Preference is given at any rate, though not necessarily exclusively, to using monomers in which the saturated aliphatic radical R is a pure hydrocarbon radical (alkyl radical), in other words one which does not include any heteroatoms from bridging groups (oxygen from ether groups, for example) and is also not substituted by functional groups (alcohol groups, for example).

If R is an alkyl radical, it may for example be a linear, branched, or cyclic alkyl radical. Such an alkyl radical may of course also have linear and cyclic or branched and cyclic structural components. The alkyl radical preferably has 1 to 20, more preferably 1 to 10, carbon atoms.

Particularly preferred monounsaturated esters of (meth)acrylic acid with an alkyl radical are methyl (meth)acrylate, ethyl (meth)acrylate, propyl (meth)-acrylate, isopropyl (meth)acrylate, n-butyl (meth)-acrylate, isobutyl (meth)acrylate, tert-butyl (meth)-acrylate, amyl (meth)acrylate, hexyl (meth)acrylate, ethylhexyl (meth)acrylate, 3,3,5-trimethylhexyl (meth)-acrylate, stearyl (meth)acrylate, lauryl (meth)-acrylate, cycloalkyl (meth)acrylates, such as cyclopentyl (meth)acrylate, isobornyl (meth)acrylate, and also cyclohexyl (meth)acrylate, with very particular preference being given to n- and tert-butyl (meth)-acrylate and to methyl methacrylate.

Examples of other suitable radicals R are saturated aliphatic radicals which comprise functional groups containing heteroatoms (for example, alcohol groups or phosphoric ester groups).

Suitable monounsaturated esters of (meth)acrylic acid with a saturated aliphatic radical substituted by one or more hydroxyl groups are 2-hydroxyethyl (meth)-acrylate, 2-hydroxypropyl (meth)acrylate, 3-hydroxypropyl (meth)acrylate, 3-hydroxybutyl (meth)acrylate, and 4-hydroxybutyl (meth)acrylate, with very particular preference being given to 2-hydroxyethyl (meth)-acrylate.

Suitable monounsaturated esters of (meth)acrylic acid with phosphoric ester groups are, for example, phosphoric esters of polypropylene glycol monometh-acrylate, such as the commercially available Sipomer PAM 200 from Rhodia.

Possible further monoolefinically unsaturated monomers containing vinyl groups are monomers which are different from the above-described acrylate-based monomers and which have a radical R' on the vinyl group that is not olefinically unsaturated.

The radical R' may be saturated aliphatic, aromatic, or mixed saturated aliphatic-aromatic, with preference being given to aromatic and mixed saturated aliphatic-aromatic radicals in which the aliphatic components represent alkyl groups.

Particularly preferred further monoolefinically unsaturated monomers containing vinyl groups are, in particular, vinyltoluene, alpha-methylstyrene, and especially styrene.

Also possible are monounsaturated monomers containing vinyl groups wherein the radical R' has the following structure:

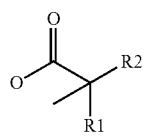

where the radicals R1 and R2 as alkyl radical contain a total of 7 carbon atoms. Monomers of this kind are available commercially under the name VeoVa 10 from Momentive.

Further monomers suitable in principle are olefinically unsaturated monomers such as acrylonitrile, methacrylonitrile, acrylamide, methacrylamide, N,N-dimethylacrylamide, vinyl acetate, vinyl propionate, vinyl chloride, N-vinylpyrrolidone, N-vinylcaprolactam, N-vinylformamide, N-vinylimidazole, N-vinyl-2-methylimidazoline, and further unsaturated alpha-beta-carboxylic acids.

Examples of suitable polyolefinically unsaturated monomers include esters of (meth)acrylic acid with an olefinically unsaturated radical R″. The radical R″ may be, for example, an allyl radical or a (meth)acryloyl radical.

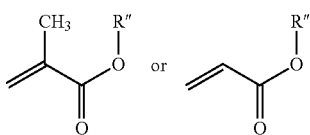

Preferred polyolefinically unsaturated monomers include ethylene glycol di(meth)acrylate, 1,2-propylene glycol di(meth)acrylate, 2,2-propylene glycol di(meth)acrylate, butane-1,4-diol di(meth)acrylate, neopentyl glycol di(meth)acrylate, 3-methylpentanediol di(meth)acrylate, diethylene glycol di(meth)acrylate, triethylene glycol di(meth)acrylate, tetraethylene glycol di(meth)acrylate, dipropylene glycol di(meth)acrylate, tripropylene glycol di(meth)acrylate, hexanediol di(meth)acrylate, and allyl (meth)acrylate.

Furthermore, preferred polyolefinically unsaturated compounds encompass acrylic and methacrylic esters of alcohols having more than two OH groups, such as, for example, trimethylolpropane tri(meth)acrylate or glycerol tri(meth)acrylate, but also trimethylolpropane di(meth)acrylate monoallyl ether, trimethylolpropane (meth)acrylate diallyl ether, pentaerythritol tri(meth)acrylate monoallyl ether, pentaerythritol di(meth)acrylate diallyl ether, pentaerythritol (meth)acrylate triallyl ether, triallylsucrose, and pentaallylsucrose.

Also possible are allyl ethers of mono- or polyhydric alcohols, such as trimethylolpropane monoallyl ether, for example.

Where used, preferred polyolefinically unsaturated monomers are hexanediol diacrylate and/or allyl (meth)acrylate.

With regard to the monomer mixtures (A), (B), and (C) used in the individual polymerization stages, there are specific conditions to be observed, which are set out below.

First of all it should be stated that the mixtures (A), (B), and (C) are at any rate different from one another. They therefore each contain different monomers and/or different proportions of at least one defined monomer.

Mixture (A) comprises at least 50 wt %, preferably at least 55 wt %, of olefinically unsaturated monomers having a water solubility of less than 0.5 g/l at 25° C. One such preferred monomer is styrene.

The solubility of the monomers in water can be determined via establishment of equilibrium of the gas space above the aqueous phase (in analogy to the reference X.-S. Chai, Q. X. Hou, F. J. Schork, Journal of Applied Polymer Science Vol. 99, 1296-1301 (2006)).

For this purpose, in a 20 ml gas space sample tube, to a defined volume of water, preferably 2 ml, a mass of the respective monomer is added which is of a magnitude such that this mass can at any rate not be dissolved completely in the selected volume of water. Additionally an emulsifier is added (10 ppm, based on total mass of the sample mixture). In order to obtain the equilibrium concentration, the mixture is shaken continually. The supernatant gas phase is replaced by inert gas, and so an equilibrium is established again. In the gas phase withdrawn, the fraction of the substance to be detected is measured (preferably by gas chromatography). The equilibrium concentration in water can be determined by plotting the fraction of the monomer in the gas phase. The slope of the curve changes from a virtually constant value (S1) to a significantly negative slope (S2) as soon as the excess monomer fraction has been removed from the mixture. The equilibrium concentration here is reached at the point of intersection of the straight line with the slope S1 and of the straight line with the slope S2. The determination described is carried out at 25° C.

The monomer mixture (A) preferably contains no hydroxy-functional monomers. Likewise preferably, the monomer mixture (A) contains no acid-functional monomers.

Very preferably the monomer mixture (A) contains no monomers at all that have functional groups containing heteroatoms. This means that heteroatoms, if present, are present only in the form of bridging groups. This is the case, for example, in the monoolefinically unsaturated monomers described above that are (meth)acrylate-based and posses an alkyl radical as radical R.

The monomer mixture (A) preferably comprises exclusively monoolefinically unsaturated monomers.

In one particularly preferred embodiment, the monomer mixture (A) comprises at least one monounsaturated ester of (meth)acrylic acid with an alkyl radical and at least one monoolefinically unsaturated monomer containing vinyl groups, with a radical arranged on the vinyl group that is aromatic or that is mixed saturated aliphatic-aromatic, in which case the aliphatic fractions of the radical are alkyl groups.

The monomers present in the mixture (A) are selected such that a polymer prepared from them possesses a glass transition temperature of 10 to 65° C., preferably of 30 to 50° C.

The glass transition temperature $T_g$ for the purposes of the invention is determined experimentally on the basis of DIN 51005 "Thermal Analysis (TA)—terms" and DIN 53765 "Thermal Analysis—Dynamic Scanning calorimetry (DSC)". This involves weighing out a 15 mg sample into a sample boat and introducing it into a DSC instrument. After cooling to the start temperature, 1st and 2nd measurement runs are carried out with inert gas flushing ($N_2$) of 50 ml/min with a heating rate of 10 K/min, with cooling to the start temperature again between the measurement runs. Measurement takes place customarily in the temperature range from about 50° C. lower than the expected glass transition temperature to about 50° C. higher than the glass transition temperature. The glass transition temperature for the purposes of the present invention, in accordance with DIN 53765, section 8.1, is that temperature in the 2nd measurement run at which half of the change in the specific heat capacity (0.5 delta $c_p$) is reached. This temperature is determined from the DSC diagram (plot of the heat flow against the temperature). It is the temperature at the point of intersection of the midline between the extrapolated baselines, before and after the glass transition, with the measurement plot.

For a useful estimation of the glass transition temperature to be expected in the measurement, the known Fox equation can be employed. Since the Fox equation represents a good approximation, based on the glass transition temperatures of the homopolymers and their parts by weight, without incorporation of the molecular weight, it can be used as a guide to the skilled person in the synthesis, allowing a desired glass transition temperature to be set via a few goal-directed experiments.

The polymer prepared in stage i. by the emulsion polymerization of the monomer mixture (A) is also called seed.

The seed possesses preferably a particle size of 20 to 125 nm (measured by means of dynamic light scattering (photon correlation spectroscopy) according to DIN ISO 13321, the particle size for the purposes of the present invention referring to the measured average particle diameter (Z-average mean). The particle size can be measured in concrete terms using, for example, a "Malvern Nano S90" (from Malvern Instruments).

Mixture (B) comprises at least one polyolefinically unsaturated monomer, preferably at least one diolefinically unsaturated monomer. One such preferred monomer is hexanediol diacrylate.

The monomer mixture (B) preferably contains no hydroxy-functional monomers. Likewise preferably, the monomer mixture (B) contains no acid-functional monomers.

Very preferably the monomer mixture (B) contains no monomers at all with functional groups containing heteroatoms. This means that heteroatoms, if present, are present only in the form of bridging groups. This is the case, for example, in the above-described monoolefinically unsaturated monomers which are (meth)acrylate-based and posses an alkyl radical as radical R.

In one particularly preferred embodiment, the monomer mixture (B), as well as the at least one polyolefinically unsaturated monomer, includes at any rate the following further monomers. First of all, at least one monounsaturated ester of (meth)acrylic acid with an alkyl radical, and secondly at least one monoolefinically unsaturated monomer containing vinyl groups and having a radical located on the vinyl group that is aromatic or that is a mixed saturated aliphatic-aromatic radical, in which case the aliphatic fractions of the radical are alkyl groups.

The fraction of polyunsaturated monomers is preferably from 0.05 to 3 mol %, based on the total molar amount of monomers in the monomer mixture (B).

The monomers present in the mixture (B) are selected such that a polymer prepared therefrom possesses a glass transition temperature of −35 to 15° C., preferably of −25 to +7° C.

The polymer prepared in the presence of the seed in stage ii. by the emulsion polymerization of the monomer mixture (B) is also referred to as the core. After stage ii., then, the result is a polymer which comprises seed and core.

The polymer which is obtained after stage ii. preferably possesses a particle size of 80 to 280 nm, preferably 120 to 250 nm.

The monomers present in the mixture (C) are selected such that a polymer prepared therefrom possesses a glass transition temperature of −50 to 15° C., preferably of −20 to +12° C.

The olefinically unsaturated monomers of this mixture (C) are preferably selected such that the resulting polymer, comprising seed, core, and shell, has an acid number of 10 to 25.

Accordingly, the mixture (C) preferably comprises at least one alpha-beta unsaturated carboxylic acid, especially preferably (meth)acrylic acid.

The olefinically unsaturated monomers of the mixture (C) are further preferably selected such that the resulting polymer, comprising seed, core, and shell, has an OH number of 0 to 30, preferably 10 to 25.

All of the aforementioned acid numbers and OH numbers are values calculated on the basis of the monomer mixtures employed overall.

In one particularly preferred embodiment, the monomer mixture (C) comprises at least one alpha-beta unsaturated carboxylic acid and at least one monounsaturated ester of (meth)acrylic acid having an alkyl radical substituted by a hydroxyl group.

In one especially preferred embodiment, the monomer mixture (C) comprises at least one alpha-beta unsaturated carboxylic acid, at least one monounsaturated ester of (meth) acrylic acid having an alkyl radical substituted by a hydroxyl group, and at least one monounsaturated ester of (meth) acrylic acid having an alkyl radical.

Where reference is made, in the context of the present invention, to an alkyl radical, without further particularization, what is always meant by this is a pure alkyl radical without functional groups and heteroatoms.

The polymer prepared in the presence of seed and core in stage iii. by the emulsion polymerization of the monomer mixture (C) is also referred to as the shell. The result after stage iii., then, is a polymer which comprises seed, core, and shell.

Following its preparation, the polymer possesses a particle size of 100 to 500 nm, preferably 125 to 400 nm, very preferably from 130 to 300 nm.

The fractions of the monomer mixtures are preferably harmonized with one another as follows. The fraction of the mixture (A) is from 0.1 to 10 wt %, the fraction of the mixture (B) is from 60 to 80 wt %, and the fraction of the mixture (C) is from 10 to 30 wt %, based in each case on the sum of the individual amounts of the mixtures (A), (B), and (C).

The aqueous dispersion (wD) preferably possesses a pH of 5.0 to 9.0, more preferably 7.0 to 8.5, very preferably 7.5 to 8.5. The pH may be kept constant during the preparation itself, through the use of bases as identified further on below, for example, or else may be set deliberately after the polymer has been prepared.

In especially preferred embodiments it is the case that the aqueous dispersion (wD) has a pH of 5.0 to 9.0 and the at least one polymer present therein has a particle size of 100 to 500 nm. Even more preferred range combinations are as follows: pH of 7.0 to 8.5 and a particle size of 125 to 400 nm, more preferably pH of 7.5 to 8.5 and a particle size of 130 to 300 nm.

The stages i. to iii. described are carried out preferably without addition to acids or bases known for the setting of the pH. If in the preparation of the polymer, for example, carboxy-functional monomers are then used, as is preferred in the context of stage iii., the pH of the dispersion may be less than 7 after the end of stage iii. Accordingly, an addition of base is needed in order to adjust the pH to a higher value, such as, for example, a value within the preferred ranges.

It follows from the above that the pH preferably after stage iii. is preferably adjusted or has to be adjusted, in particular through addition of a base such as an organic, nitrogen-containing base, such as an amine such as ammonia, trimethylamine, triethylamine, tributylamines, dimethylaniline, triphenylamine, N,N-dimethylethanolamine, methyldiethanolamine, or triethanolamine, and also by addition of sodium hydrogencarbonate or borates, and also mixtures of the aforesaid substances. This, however, does not rule out the possibility of adjusting the pH before, during, or after the emulsion polymerizations or else between the individual emulsion polymerizations. It is likewise possible for there to be no need at all for the pH to be adjusted to a desired value, owing to the choice of the monomers.

The measurement of the pH here is carried out preferably using a pH meter (for example, Mettler-Toledo S20 SevenEasy pH meter) having a combined pH electrode (for example, Mettler-Toledo InLab® Routine).

The solids content of the dispersion (wD) is preferably from 15% to 40% and more preferably 20% to 30%.

The dispersion (wD) is aqueous. The expression "aqueous" is known to the skilled person. The system involved comprises primarily water as solvent, and comprises organic solvents only in minor proportions. The extent to which the expression "aqueous" is to be understood in preferred embodiments may differ between different systems under consideration (such as the aqueous dispersion (wD) or the aqueous basecoat material (b.2.1)).

Hence it is preferably the case for the aqueous dispersion (wD) that it comprises a fraction of 55 to 75 wt %, especially preferably 60 to 70 wt %, based in each case on the total weight of the dispersion, of water.

It is further preferred for the percentage sum of the solids content of the dispersion (wD) and the fraction of water in the dispersion (wD) to be at least 80 wt %, preferably at least 90 wt %. Preferred in turn are ranges from 80 to 99 wt %, especially 90 to 97.5 wt %. In this figure, the solids content, which traditionally only possesses the unit "%", is reported in "weight %". Since the solids content ultimately also represents a percentage weight figure, this form of representation is justified. Where, for example, a dispersion has a solids content of 25% and a water content of 70 wt %, the above-defined percentage sum of the solids content and the fraction of water amounts to 95 wt %, therefore.

The dispersion accordingly consists very largely of water and of the specific polymer, and environmentally burdensome components, such as organic solvents in particular, are present only in minor proportions or not at all.

The fraction of the one or more dispersions (wD), based on the total weight of the aqueous basecoat material (b.2.1), is preferably 5 to 60 wt %, more preferably 10 to 50 wt %, and very preferably 20 to 45 wt %.

The fraction of the polymers originating from the dispersions (wD), based on the total weight of the aqueous basecoat material (b.2.1), is preferably from 1 to 24 wt %, more preferably 2.5 to 20.0 wt % and very preferably 3 to 18.0 wt %.

Determining or specifying the fraction of the polymers originating from the dispersions (wD) for inventive use in the basecoat material may be done via the determination of the solids content (also called nonvolatile fraction or solids fraction) of a dispersion (wD) which is to be used in the basecoat material.

In the case of a possible particularization to basecoat materials comprising preferred dispersions (wD) in a specific proportional range, the following applies. The dispersions (wD) which do not fall within the preferred group may of course still be present in the basecoat material. In that case the specific proportional range applies only to the preferred group of dispersions (wD). It is preferred nonetheless for the total proportion of dispersions (wD), consisting of dispersions from the preferred group and dispersions which are not part of the preferred group, to be subject likewise to the specific proportional range.

In the case of a restriction to a proportional range of 10 to 50 wt % and to a preferred group of dispersions (wD), therefore, this proportional range evidently applies initially only to the preferred group of dispersions (wD). In that case, however, it would be preferable for there to be likewise from 10 to 50 wt % in total present of all originally encompassed dispersions, consisting of dispersions from the preferred group and dispersions which do not form part of the preferred group. If, therefore, 35 wt % of dispersions (wD) of the preferred group are used, not more than 15 wt % of the dispersions of the non-preferred group may be used.

The stated principle is valid, for the purposes of the present invention, for all stated components of the basecoat material and for their proportional ranges—for example, for the pigments specified later on below, or else for the crosslinking agents specified later on below, such as melamine resins.

The basecoat material (b.2.1) for use in accordance with the invention preferably comprises at least one pigment. Reference here is to conventional pigments imparting color and/or optical effect.

Such color pigments and effect pigments are known to those skilled in the art and are described, for example, in Römpp-Lexikon Lacke and Druckfarben, Georg Thieme Verlag, Stuttgart, N.Y., 1998, pages 176 and 451. The terms "coloring pigment" and "color pigment" are interchangeable, just like the terms "optical effect pigment" and "effect pigment".

Preferred effect pigments are, for example, platelet-shaped metal effect pigments such as lamellar aluminum pigments, gold bronzes, oxidized bronzes and/or iron oxide-aluminum pigments, pearlescent pigments such as pearl essence, basic lead carbonate, bismuth oxide chloride and/or metal oxide-mica pigments and/or other effect pigments such as lamellar graphite, lamellar iron oxide, multilayer effect pigments composed of PVD films and/or liquid crystal polymer pigments. Particularly preferred are lamellar metal effect pigments, more particularly lamellar aluminum pigments.

Typical color pigments especially include inorganic coloring pigments such as white pigments such as titanium dioxide, zinc white, zinc sulfide or lithopone; black pigments such as carbon black, iron manganese black, or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

The fraction of the pigments is preferably situated in the range from 1.0 to 40.0 wt %, preferably 2.0 to 35.0 wt %, more preferably 5.0 to 30.0 wt %, based on the total weight of the aqueous basecoat material (b.2.1) in each case.

The aqueous basecoat material (b.2.1) preferably further comprises at least one polymer as binder that is different from the polymers present in the dispersions (D), more particularly at least one polymer selected from the group consisting of polyurethanes, polyesters, polyacrylates and/or copolymers of the stated polymers, more particularly polyesters and/or polyurethane polyacrylates. Preferred polyesters are described, for example, in DE 4009858 A1 in column 6, line 53 to column 7, line 61 and column 10, line 24 to column 13, line 3, Or WO 2014/033135 A2, page 2, line 24 to page 7, line 10 and page 28, line 13 to page 29, line 13. Preferred polyurethanepolyacrylate copolymers (acrylated polyurethanes) and their preparation are described in, for example, WO 91/15528 A1, page 3, line 21 to page 20, line 33, and DE 4437535 A1, page 2, line 27 to page 6, line 22. The described polymers as binders are preferably hydroxy-functional and especially preferably possess an OH number in the range from 15 to 200 mg KOH/g, more preferably from 20 to 150 mg KOH/g. The basecoat materials more preferably comprise at least one hydroxy-functional polyurethanepolyacrylate copolymer, more preferably still at least one hydroxy-functional polyurethanepolyacrylate copolymer and also at least one hydroxy-functional polyester.

The proportion of the further polymers as binders may vary widely and is situated preferably in the range from 1.0 to 25.0 wt %, more preferably 3.0 to 20.0 wt %, very preferably 5.0 to 15.0 wt %, based in each case on the total weight of the basecoat material (b.2.1).

The basecoat material (b.2.1) may further comprise at least one typical crosslinking agent known per se. If it comprises a crosslinking agent, said agent comprises preferably at least one aminoplast resin and/or at least one blocked polyisocyanate, preferably an aminoplast resin. Among the aminoplast resins, melamine resins in particular are preferred.

If the basecoat material (b.2.1) does comprise crosslinking agents, the proportion of these crosslinking agents, more particularly aminoplast resins and/or blocked polyisocyanates, very preferably aminoplast resins and, of these, preferably melamine resins, is preferably in the range from 0.5 to 20.0 wt %, more preferably 1.0 to 15.0 wt %, very preferably 1.5 to 10.0 wt %, based in each case on the total weight of the basecoat material (b.2.1).

The basecoat material (b.2.1) may further comprise at least one thickener. Suitable thickeners are inorganic thickeners from the group of the phyllosilicates such as lithium aluminum magnesium silicates. Likewise, the basecoat material may preferably comprise at least one organic thickener, as for example a (meth)acrylic acid-(meth)acrylate copolymer thickener or a polyurethane thickener. Employed for example here may be conventional organic associative thickeners, such as the known associative polyurethane thickeners, for example. Associative thickeners, as is known, are termed water-soluble polymers which have strongly hydrophobic groups at the chain ends or in side chains, and/or whose hydrophilic chains contain hydrophobic blocks or concentrations in their interior. As a result, these polymers possess a surfactant character and are capable of forming micelles in aqueous phase. In similarity with the surfactants, the hydrophilic regions remain in the aqueous phase, while the hydrophobic regions enter into the particles of polymer dispersions, adsorb on the surface of other solid particles such as pigments and/or fillers, and/or form micelles in the aqueous phase. Ultimately a thickening effect is achieved, without any increase in sedimentation behavior.

Thickeners as stated are available commercially. The proportion of the thickeners is preferably in the range from 0.1 to 5.0 wt %, more preferably 0.2 to 3.0 wt %, very preferably 0.3 to 2.0 wt %, based in each case on the total weight of the basecoat material.

Furthermore, the basecoat material (b.2.1) may further comprise at least one further adjuvant. Examples of such adjuvants are salts which are thermally decomposable without residue or substantially without residue, polymers as binders that are curable physically, thermally and/or with actinic radiation and that are different from the polymers already stated as binders, further crosslinking agents, organic solvents, reactive diluents, transparent pigments, fillers, molecularly dispersely soluble dyes, nanoparticles, light stabilizers, antioxidants, deaerating agents, emulsifiers, slip additives, polymerization inhibitors, initiators of radical polymerizations, adhesion promoters, flow control agents, film-forming assistants, sag control agents (SCAs), flame retardants, corrosion inhibitors, waxes, siccatives, biocides, and matting agents. Such adjuvants are used in the customary and known amounts.

The solids content of the basecoat material (b.2.1) may vary according to the requirements of the case in hand. The solids content is guided primarily by the viscosity that is needed for application, more particularly spray application. A particular advantage is that the basecoat material for inventive use, for comparatively high solids contents, is able nevertheless to have a viscosity which allows appropriate application.

The solids content of the basecoat material is preferably at least 16.5%, more preferably at least 18.0%, even more preferably at least 20.0%.

Under the stated conditions, in other words at the stated solids contents, preferred basecoat materials (b.2.1) have a viscosity of 40 to 150 mPa·s, more particularly 70 to 120 mPa·s, at 23° C. under a shearing load of 1000 1/s (for further details regarding the measurement method, see Examples section). For the purposes of the present invention, a viscosity within this range under the stated shearing load is referred to as spray viscosity (working viscosity). As is known, coating materials are applied at spray viscosity, meaning that under the conditions then present (high shearing load) they possess a viscosity which in particular is not too high, so as to permit effective application. This means that the setting of the spray viscosity is important, in order to allow a paint to be applied at all by spray methods, and to ensure that a complete, uniform coating film is able to form on the substrate to be coated.

The basecoat material for inventive use is aqueous (regarding the fundamental definition of "aqueous", see above).

The fraction of water in the basecoat material (b.2.1) is preferably from 35 to 70 wt %, and more preferably 45 to 65 wt %, based in each case on the total weight of the basecoat material.

Even more preferred is for the percentage sum of the solids content of the basecoat material and the fraction of water in the basecoat material to be at least 70 wt %, preferably at least 75 wt %. Among these figures, preference is given to ranges of 75 to 95 wt %, in particular 80 to 90 wt %.

This means in particular that preferred basecoat materials comprise components that are in principle a burden on the environment, such as organic solvents in particular, in relation to the solids content of the basecoat material, at only low fractions. The ratio of the volatile organic fraction of the basecoat material (in wt %) to the solids content of the basecoat material (in analogy to the representation above, here in wt %) is preferably from 0.05 to 0.7, more preferably from 0.15 to 0.6. In the context of the present invention, the volatile organic fraction is considered to be that fraction of the basecoat material that is considered neither part of the water fraction nor part of the solids content.

Another advantage of the basecoat material (b.2.1) is that it can be prepared without the use of eco-unfriendly and health-injurious organic solvents such as N-methyl-2-pyrrolidone, dimethylformamide, dioxane, tetrahydrofuran, and N-ethyl-2-pyrrolidone. Accordingly, the basecoat material preferably contains less than 10 wt %, more preferably less than 5 wt %, more preferably still less than 2.5 wt % of organic solvents selected from the group consisting of N-methyl-2-pyrrolidone, dimethylformamide, dioxane, tetrahydrofuran, and N-ethyl-2-pyrrolidone. The basecoat material is preferably entirely free from these organic solvents.

The basecoat materials can be produced using the mixing assemblies and mixing techniques that are customary and known for the production of basecoat materials.

For the basecoat materials (b.2.2.x) used in the method of the invention it is the case that at least one of these basecoat materials has the inventively essential features described for the basecoat material (b.2.1).

This means, in particular, that at least one of the basecoat materials (b.2.2.x) comprises at least one aqueous dispersion (wD). The preferred features and embodiments described as part of the description of the basecoat material (b.2.1) preferably also apply to at least one of the basecoat materials (b.2.2.x). The above preferably applies to all of the basecoat materials (b.2.2.x) used.

In the preferred variants of stage (2.2) of the method of the invention, described earlier on above, a first basecoat material (b.2.2.a) is first of all applied, and may also be termed a color-preparatory basecoat material. It therefore serves as a base for at least one color and/or effect basecoat film that then follows, this being a film which is then able optimally to fulfill its function of imparting color and/or effect.

In one particular embodiment, a color-preparatory basecoat material is substantially free from chromatic pigments and effect pigments. More particularly preferably a basecoat material of this kind contains less than 2 wt %, preferably less than 1 wt %, of chromatic pigments and effect pigments, based in each case on the total weight of the aqueous basecoat material. In this embodiment the color-preparatory basecoat material preferably comprises black and/or white pigments, especially preferably both kinds of these pigments. It comprises preferably 5 to 30 wt %, preferably 10 to 25 wt %, of white pigments, and 0.01 to 1.00 wt %, preferably 0.1 to 0.5 wt %, of black pigments, based in each case on the total weight of the basecoat material. The resultant white, black, and more particularly gray color, which can be adjusted in different lightness stages through the ratio of white pigments and black pigments, represents an individually adaptable basis for the basecoat film system that then follows, allowing the color and/or the effect imparted by the subsequent basecoat system to be manifested optimally. The pigments are known to the skilled person and have also been described earlier on above. A preferred white pigment here is titanium dioxide, a preferred black pigment carbon black. As already described, however, this basecoat material may of course also comprise chromatic and/or effect pigments. This variant is appropriate especially when the resultant multicoat paint system is to have a highly chromatic hue, as for example a very deep red or yellow. Where pigments in appropriately chromatic hue are also added to the color-preparatory basecoat material, a further improved coloration can be achieved.

The color and/or effect basecoat material(s) for the second basecoat film or for the second and third basecoat films within this embodiment are adapted in accordance with the ultimately desired coloration of the overall system. Where the desire is for a white, black, or gray color, the at least one further basecoat material comprises the corresponding pigments and in terms of the pigment composition ultimately resembles the color-preparatory basecoat material. Where the desire is for a chromatic and/or effect paint system, as for example a chromatic solid-color paint system or a metallic-effect paint system, corresponding chromatic and/or effect pigments are used in amounts of, for example, 1 to 15 wt %, preferably 3 to 10 wt %, based in each case on the total weight of the basecoat material. Chromatic pigments belong to the group of color pigments, the latter also encompassing achromatic color pigments such as black or white pigments. Basecoat materials of this kind may of course also include black and/or white pigments as well for the purpose of lightness adaptation.

The method of the invention allows multicoat paint systems to be produced on metallic substrates without a separate curing step. Nevertheless, application of the method of the invention results in multicoat paint systems which exhibit excellent stability toward pinholes, meaning that even relatively high film thicknesses of the corresponding basecoat films can be built up without loss of esthetic quality. Other optical properties such as the overall appearance are also outstanding.

Examples

Description of Methods

1. Solids Content (Nonvolatile Fraction)

The nonvolatile fraction is determined according to DIN EN ISO 3251 (date: June 2008). It involves weighing out 1 g of sample into an aluminum dish which has been dried beforehand, drying it in a drying oven at 125° C. for 60 minutes, cooling it in a desiccator and then reweighing it. The residue relative to the total amount of sample used corresponds to the nonvolatile fraction. The volume of the nonvolatile fraction may optionally be determined if necessary according to DIN 53219 (date: August 2009).

2. Film Thicknesses

The film thicknesses are determined according to DIN EN ISO 2808 (date: May 2007), method 12A, using the MiniTest® 3100-4100 instrument from ElektroPhysik.

3. Assessment of the Incidence of Pops and Runs

To determine the propensity toward popping and running, in accordance with DIN EN ISO 28199-1 (date: January 2010) and DIN EN ISO 28199-3 (date: January 2010), multicoat paint systems are produced according to the following general protocol:

A perforated steel panel coated with a cured cathodic electrocoat (CEC) (CathoGuard® 800 from BASF Coatings GmbH), with dimensions of 57 cm×20 cm (according to DIN EN ISO 28199-1, section 8.1, version A) is prepared in analogy to DIN EN ISO 28199-1, section 8.2 (version A). Subsequently, in accordance with DIN EN ISO 28199-1, section 8.3, an aqueous basecoat material is applied in a single application electrostatically, in the form of a wedge, with a target film thickness (film thickness of the dried material) in the range from 0 μm to 30 μm. After a flashing time at 18-23° C. of 10 minutes (running test) or without a prior flashing time (popping test), the resulting basecoat is subjected to interim drying in a forced air oven at 80° C. for 5 minutes. In the case of the test for runs, the panels are flashed and interim-dried in a vertical position.

The determination of the popping limit, i.e., of the basecoat film thickness from which pops occur, is made according to DIN EN ISO 28199-3, section 5.

The determination of the running tendency is carried out according to DIN EN ISO 28199-3, section 4. As well as the film thickness at which a run exceeds a length of 10 mm from the bottom edge of the perforation, a determination is made of the film thickness above which an initial tendency to run can be observed visually at a perforation.

4. Painting of Waterborne Basecoat Material Wedge Constructions

To assess the incidence of pinholes and also the flow as function of film thickness, wedge-format multicoat paint systems are produced in accordance with the following general protocols:

Variant A: First Waterborne Basecoat Material as Wedge, Second Waterborne Basecoat Material as Constant Coat A steel panel with dimensions of 30×50 cm, coated with a cured standard CEC (CathoGuar® 800 from BASF Coatings), is provided with two adhesive strips (Tesaband adhesive tape, 19 mm) at one longitudinal edge, to allow determination of film thickness differences after coating.

The first waterborne basecoat material is applied electrostatically as a wedge with a target film thickness (film thickness of the dried material) of 0-30 µm. After flashing at room temperature for 3 minutes, one of the two adhesive strips is removed and then the second waterborne basecoat material is applied likewise electrostatically in a single application. The target film thickness (film thickness of the dried material) is 13-16 µm. After a further flashing time of 4 minutes at room temperature, the system is interim-dried in a forced air oven at 60° C. for 10 minutes. Following removal of the second adhesive strip, a commercial two-component clearcoat material (ProGloss® from BASF Coatings GmbH) is applied by gravity-fed spray gun manually to the interim-dried system, with a target film thickness (film thickness of the dried material) of 40-45 µm. The resulting clearcoat film is flashed at room temperature (18 to 23° C.) for 10 minutes; subsequently, curing takes place in a forced air oven at 140° C. for a further 20 minutes.

Variant B: First Waterborne Basecoat Material as Constant Coat, Second Waterborne Basecoat Material as Wedge A steel panel with dimensions of 30×50 cm, coated with a cured standard CEC (CathoGuard® 800 from BASF Coatings), is provided with two adhesive strips (Tesaband adhesive tape, 19 mm) at one longitudinal edge, to allow determination of film thickness differences after coating.

The first waterborne basecoat material is applied electrostatically with a target film thickness (film thickness of the dried material) of 18-22 µm. After flashing at room temperature for 3 minutes, one of the two adhesive strips is removed and then the second waterborne basecoat material is applied likewise electrostatically in a single application as a wedge. The target film thickness (film thickness of the dried material) is 0-30 µm. After a further flashing time of 4 minutes at room temperature, the system is interim-dried in a forced air oven at 60° C. for 10 minutes. Following removal of the second adhesive strip, a commercial two-component clearcoat material (ProGloss® from BASF Coatings GmbH) is applied by gravity-fed spray gun manually to the interim-dried system, with a target film thickness (film thickness of the dried material) of 40-45 µm. The resulting clearcoat film is flashed at room temperature (18 to 23° C.) for 10 minutes; subsequently, curing takes place in a forced air oven at 140° C. for a further 20 minutes.

Variant C: One Waterborne Basecoat Material as Wedge

A steel panel with dimensions of 30×50 cm, coated with a cured standard CEC (CathoGuard® 800 from BASF Coatings), is provided with two adhesive strips (Tesaband adhesive tape, 19 mm) at one longitudinal edge, to allow determination of film thickness differences after coating.

The waterborne basecoat material is applied electrostatically as a wedge with a target film thickness (film thickness of the dried material) of 0-30 µm. After a flashing time of 4 minutes at room temperature, the system is interim-dried in a forced air oven at 80° C. for 10 minutes.

Following removal of the adhesive strip, a commercial two-component clearcoat material (ProGloss® from BASF Coatings GmbH) is applied by gravity-fed spray gun manually to the interim-dried waterborne basecoat film, with a target film thickness (film thickness of the dried material) of 40-45 µm. The resulting clearcoat film is flashed at room temperature (18 to 23° C.) for 10 minutes; subsequently, curing takes place in a forced air oven at 140° C. for a further 20 minutes.

5. Assessment of the Incidence of Pinholes

To assess the incidence of pinholes, multicoat paint systems are produced as per the methods for the painting of waterborne basecoat wedge systems (variant A and B, respectively), and are then evaluated visually according to the following general protocol:

The dry film thickness of the overall waterborne basecoat material system, consisting of the first and second waterborne basecoat materials, is checked and, for the basecoat film thickness wedge, the 0-20 µm region and the region from 20 µm to the end of the wedge are marked on the steel panel.

The pinholes are evaluated visually in the two separate regions of the waterborne basecoat wedge. The number of pinholes per region is counted. All results are standardized to an area of 200 $cm^2$. In addition, optionally, a record is made of that dry film thickness of the waterborne basecoat material wedge from which pinholes no longer occur.

6. Assessment of the Film Thickness-Dependent Leveling

To assess the film thickness-dependent leveling, multicoat paint systems are produced as per the methods for the painting of waterborne basecoat wedge systems (variant A, B, or C respectively), and are then evaluated visually according to the following general protocol:

The dry film thickness of the overall waterborne basecoat material system, consisting of the waterborne basecoat material or of the first and second waterborne basecoat materials, is checked and, for the basecoat film thickness wedge, the 15-20 µm and also 20-25 µm regions, or 10-15 µm, 15-20 µm, 20-25 µm, 25-30 µm, and, optionally, 30-35 µm regions are marked on the steel panel.

The determination or assessment of the film thickness-dependent leveling takes place by means of the Wave scan instrument from Byk/Gardner within the four basecoat film thickness regions determined beforehand. For this purpose, a laser beam is directed at an angle of 60° onto the surface under investigation, and the fluctuations in the reflected light in the so-called short wave range (0.3 to 1.2 mm) and in the so-called long wave range (1.2 to 12 mm) are recorded by the instrument over a measuring distance of 10 cm (long wave=LW; short wave=SW; the lower the values, the better the appearance). Moreover, as a measure of the sharpness of an image reflected in the surface of the multicoat system, the instrument determines the characteristic variable "distinctness of image" (DOI) (the higher the value, the better the appearance).

7. Assessment of the Film Thickness-Independent Leveling

To assess the film thickness-independent leveling, multicoat paint systems are produced according to the following general protocol:

The first waterborne basecoat material is applied electrostatically with a target film thickness (film thickness of the dried material) of 18 µm to a steel panel with dimensions of 30×50 cm, coated with a cured standard CEC (CathoGuard®

800 from BASF Coatings). After a flashing time of 7 minutes 30 seconds at room temperature, the second waterborne basecoat material is applied electrostatically with a target film thickness of 12-13 µm. After a further flashing time at room temperature of 4 minutes 30 seconds, the system is interim-dried in a forced air oven at 70° C. for 7 minutes 30 seconds.

Applied electrostatically to the interim-dried waterborne basecoat film is a commercial scratch-resistant two-component clearcoat material (Ceramiclear® 5.1 from PPG) with a target film thickness (film thickness of the dried material) of 40-45 µm. The resulting clearcoat film is flashed at room temperature for 8 minutes; subsequently, curing takes place in a forced air oven at 140° C. for a further 20 minutes.

The leveling is captured metrically in accordance with the method described above (see Assessment of the film thickness-dependent leveling).

8. Assessment of the Adhesion Properties after Condensation

To assess the adhesion properties after condensation, multicoat paint systems are produced according to the following general protocol:

The waterborne basecoat material is applied electrostatically with a target film thickness (film thickness of the dried material) of 18 µm to a steel panel with dimensions of 30×50 cm, coated with a cured standard CEC (CathoGuard® 800 from BASF Coatings).

After a flashing time of 4 minutes at room temperature, the system is interim-dried in a forced air oven at 80° C. for 10 minutes.

Applied manually atop the interim-dried waterborne basecoat film using a gravity-fed spray gun is a commercial two-component clearcoat material (ProGloss® from BASF Coatings GmbH) with a target film thickness (film thickness of the dried material) of 40-45 µm. The resulting clearcoat film is flashed at room temperature (18 to 23° C.) for 10 minutes; subsequently, curing takes place in a forced air oven at 140° C. for a further 20 minutes.

The samples with the respective multicoat systems are then stored over a period of 10 days in a conditioning chamber under CH test conditions according to DIN EN ISO 6270-2:2005-09.

For the assessment of the technological properties of the multicoat systems, cross-cuts were carried out according to DIN EN ISO 2409 (rating GT 0 to GT 5; 0=best score; 5=worst score). The multicoat paint systems are assessed for stonechip adhesion in accordance with DIN EN ISO 20567-1, Method B. The assessment of the resulting damage is made likewise according to DIN EN ISO 20567-1. Furthermore, steam jet tests were carried out according to DIN 55662, Method B. The scratches (in a diagonal cross) were made with a Sikkens scratch needle (see DIN EN ISO 17872 Annex A). The assessment of the steam jet test results was carried out according to DIN 55662, and in particular the maximum width of the detachments in millimeters was ascertained.

Preparation of Aqueous Dispersions

The Preparation Protocol Described Below Refers to Table A.

Monomer Mixture (A), Stage i.

80 wt % of items 1 and 2 from table A are introduced into a steel reactor (5 L volume) with reflux condenser and heated to 80° C. The remaining fractions of the components listed under "Initial charge" in table A are premixed in a separate vessel. This mixture and, separately from it, the initiator solution (table A, items 5 and 6) are added dropwise to the reactor simultaneously over the course of 20 minutes, the fraction of the monomers in the reaction solution, based on the total amount of monomers used in step i., not exceeding 6.0 wt % throughout the entire reaction time. Subsequently, stirring takes place for 30 minutes.

Monomer Mixture (B), Stage ii.

The components indicated under "Mono 1" in table A are premixed in a separate vessel. This mixture is added dropwise to the reactor over the course of 2 hours, with the fraction of the monomers in the reaction solution, based on the total amount of monomers used in stage ii., not exceeding 6.0 wt % throughout the entire reaction time. Subsequently, stirring is carried out for 1 hour.

Monomer Mixture (C), Stage iii.

The components indicated under "Mono 2" in table A are premixed in a separate vessel. This mixture is added dropwise to the reactor over the course of 1 hour, with the fraction of the monomers in the reaction solution, based on the total amount of monomers used in stage iii., not exceeding 6.0 wt % throughout the entire reaction time. Subsequently, stirring is carried out for 2 hours.

Thereafter the reaction mixture is cooled to 60° C. and the neutralizing mixture (table A, items 20, 21, and 22) is premixed in a separate vessel. The neutralizing mixture is added dropwise to the reactor over the course of 40 minutes, during which the pH of the reaction solution is adjusted to a value of 7.5 to 8.5. The reaction product is subsequently stirred for 30 minutes more, cooled to 25° C., and filtered.

TABLE A

Aqueous dispersions

| | | BM2* | BM3* | BM4 | BM5 | BM6 | BM7 |
|---|---|---|---|---|---|---|---|
| | Initial charge | | | | | | |
| 1 | DI water | 41.81 | 41.81 | 41.81 | 41.81 | 41.81 | 41.81 |
| 2 | EF 800 | 0.18 | 0.18 | 0.18 | 0.18 | 0.18 | 0.18 |
| 3 | Styrene | 0.68 | 0.93 | 0.93 | 0.93 | 0.23 | 0.23 |
| 4 | n-Butyl acrylate | 0.48 | 0.23 | 0.23 | 0.23 | 0.93 | 0.93 |
| | Initiator solution | | | | | | |
| 5 | DI water | 0.53 | 0.53 | 0.53 | 0.53 | 0.53 | 0.53 |
| 6 | APS | 0.02 | 0.02 | 0.02 | 0.02 | 0.02 | 0.02 |
| | Mono 1 | | | | | | |
| 7 | DI water | 12.78 | 12.78 | 12.78 | 12.78 | 12.78 | 12.78 |
| 8 | EF 800 | 0.15 | 0.15 | 0.15 | 0.15 | 0.15 | 0.15 |
| 9 | APS | 0.02 | 0.02 | 0.02 | 0.02 | 0.02 | 0.02 |
| 10 | Styrene | 5.61 | 5.61 | 12.41 | 12.41 | 12.41 | 12.41 |
| 11 | n-Butyl acrylate | 13.6 | 13.6 | 6.8 | 6.8 | 6.8 | 6.8 |
| 12 | 1,6-HDDA | 0.34 | 0.34 | 0.34 | 0.34 | 0.34 | 0.34 |
| | Mono 2 | | | | | | |
| 13 | DI water | 5.73 | 5.73 | 5.73 | 5.73 | 5.73 | 5.73 |
| 14 | EF 800 | 0.07 | 0.07 | 0.07 | 0.07 | 0.07 | 0.07 |
| 15 | APS | 0.02 | 0.02 | 0.02 | 0.02 | 0.02 | 0.02 |
| 16 | Methacrylic acid | 0.71 | 0.71 | 0.71 | 0.71 | 0.71 | 0.71 |
| 17 | 2-HEA | 0.95 | 0.95 | 0.95 | 0.95 | 0.95 | 0.95 |
| 18 | n-Butyl acrylate | 3.74 | 1.87 | 3.74 | 1.87 | 3.74 | 1.87 |
| 19 | MMA | 0.58 | 2.45 | 0.58 | 2.45 | 0.58 | 2.45 |
| | Neutralization | | | | | | |
| 20 | DI water | 6.48 | 6.48 | 6.48 | 6.48 | 6.48 | 6.48 |
| 21 | Butyl glycol | 4.76 | 4.76 | 4.76 | 4.76 | 4.76 | 4.76 |
| 22 | DMEA | 0.76 | 0.76 | 0.76 | 0.76 | 0.76 | 0.76 |

*can be used as per the invention

The solids content was determined in order to monitor reaction. The results are reported in table B:

TABLE B

Solids content of the aqueous dispersions

|  | BM2* | BM3* | BM4 | BM5 | BM6 | BM7 |
|---|---|---|---|---|---|---|
| Solids content [%] | 25.5 | 25.5 | 25.5 | 26 | 27.4 | 26.1 |

*can be used as per the invention

After each stage and after the final neutralization, the particle size was determined. The results are reproduced in table C.

TABLE C

Particle sizes in nanometers

|  |  | BM2* | BM3* | BM4 | BM5 | BM6 | BM7 |
|---|---|---|---|---|---|---|---|
| i | After "Initial charge" | 90 | 70 | 70 | 70 | 120 | 120 |
| ii | After "Mono 1" | 150 | 160 | 160 | 180 | 150 | 160 |
| iii | After "Mono 2" | 190 | 230 | 230 | 250 | 220 | 200 |
| iiii | After neutralization | 240 | 290 | 275 | 300 | 250 | 245 |

*can be used as per the invention

Each of the indicated monomer mixtures (A), (B), and (C) (corresponding to "Initial charge", "Mono 1" and "Mono 2") was polymerized individually and the respective glass transition temperature of the polymer obtained was then determined. Additionally, the glass transition temperature was determined for the entire polymer after neutralization.

The results are reported in table D.

TABLE D

Glass transition temperatures in ° C.

|  |  | BM2* | BM3* | BM4 | BM5 | BM6 | BM7 |
|---|---|---|---|---|---|---|---|
| i | "Initial charge" | 30 | 50 | 48 | 50 | −9 | −9 |
| ii | "Mono 1" | −11 | −12 | 45 | 45 | 47 | 48 |
| iii | "Mono 2" | 4 | 6 | 4 | 4 | 5 | 4 |
|  | Entire polymer | −9 | −7 | 46 | 47 | 45 | 46 |

*can be used as per the invention

Preparation of a Further Aqueous Dispersion BM8 (as Per Korea Polym. J., Vol. 7, No. 4, Pp. 213-222)

Components 1 to 4 from table E are introduced into a steel reactor (5 L volume) with reflux condenser and heated to 80° C. The initiator solution (table E, items 5 and 6) is added dropwise to the reactor over the course of 5 minutes. This is followed by stirring for 30 minutes.

The components indicated in table E under "Mono 1" are premixed in a separate vessel. This mixture is added dropwise to the reactor over the course of 2 hours. This is followed by stirring for 1 hour.

The components indicated in table E under "Mono 2" are premixed in a separate vessel. This mixture is added dropwise to the reactor over the course of 1 hour. This is followed by stirring for 1 hour.

Thereafter the reaction mixture is cooled to 60° C. and the neutralizing mixture (table E, items 21 and 22) is premixed in a separate vessel. The neutralizing mixture is added dropwise to the reactor over the course of 40 minutes. The reaction product is subsequently stirred for 30 minutes more and cooled to 25° C.

TABLE E

Aqueous dispersion BM8

|  |  | BM8 |
|---|---|---|
|  | Initial charge |  |
| 1 | DI water | 43.54 |
| 2 | Rhodapex CO 436 | 0.16 |
| 3 | Styrene | 0.5 |
| 4 | Ethyl acrylate | 0.55 |
|  | Initiator solution |  |
| 5 | DI water | 0.55 |
| 6 | APS | 0.02 |
|  | Mono 1 |  |
| 7 | DI water | 13.31 |
| 8 | Rhodapex CO 436 | 0.13 |
| 9 | APS | 0.02 |
| 10 | Styrene | 5.84 |
| 11 | Ethyl acrylate | 11.05 |
| 12 | 1,6-HDDA | 0.35 |
|  | Mono 2 |  |
| 13 | DI water | 5.97 |
| 14 | Rhodapex CO 436 | 0.06 |
| 15 | APS | 0.02 |
| 16 | Methacrylic acid | 0.74 |
| 17 | 2-HEA | 0.99 |
| 18 | Ethyl acrylate | 3.04 |
| 19 | MMA | 0.6 |
|  | Neutralization |  |
| 20 | DI water | 6.75 |
| 21 | Butyl glycol | 4.96 |
| 22 | DMEA | 0.79 |
|  | pH | 8.1 |

The solids content was 23.4%.

After each stage and after the final neutralization, the particle size was determined. The results are reproduced in table F.

TABLE F

Particle sizes in nanometers

|  |  | BM8 |
|---|---|---|
| i | After "initial charge" | 110 |
| ii | After "Mono 1" | 196 |
| iii | After "Mono 2" | 223 |
| iiii | After neutralization | 310 |

Each of the specified monomer mixtures was polymerized individually and the respective glass transition temperature of the polymer obtained was determined subsequently. In addition the glass transition temperature was determined for the entire polymer after neutralization.

The results are reported in table G.

TABLE G

Glass transition temperatures in ° C.

|  |  | BM8 |
|---|---|---|
| i | "Initial charge" | 32 |
| ii | "Mono 1" | 26 |

TABLE G-continued

Glass transition temperatures in ° C.

| | | BM8 |
|---|---|---|
| iii | "Mono 2" | 35 |
| | Entire polymer | 26 |

Preparation of Aqueous Basecoat Materials

The following should be taken into account regarding the formulation constituents and amounts thereof as indicted in the tables hereinafter. When reference is made to a commercial product or to a preparation protocol described elsewhere, the reference, independently of the principle designation selected for the constituent in question, is to precisely this commercial product or precisely the product prepared with the referenced protocol.

Accordingly, where a formulation constituent possesses the principal designation "melamine-formaldehyde resin" and where a commercial product is indicated for this constituent, the melamine-formaldehyde resin is used in the form of precisely this commercial product. Any further constituents present in the commercial product, such as solvents, must therefore be taken into account if conclusions are to be drawn about the amount of the active substance (of the melamine-formaldehyde resin).

If, therefore, reference is made to a preparation protocol for a formulation constituent, and if such preparation results, for example, in a polymer dispersion having a defined solids content, then precisely this dispersion is used. The overriding factor is not whether the principal designation that has been selected is the term "polymer dispersion" or merely the active substance, for example, "polymer", "polyester", or "polyurethane-modified polyacrylate". This must be taken into account if conclusions are to be drawn concerning the amount of the active substance (of the polymer).

All proportions indicated in the tables are parts by weight.

1.1a Preparation of a Noninventive Waterborne Basecoat Material WBM A1, of a Noninventive Waterborne Basecoat Material WBM A2, and of an Inventive Waterborne Basecoat Material WBM A3

The components listed under "Aqueous phase" in table 1.1a are combined with stirring in the order stated to form an aqueous mixture. This mixture is then stirred for 10 minutes and adjusted using deionized water and dimethylethanolamine to a pH of 8 and to a spray viscosity of 90 mPa·s under a shearing load of 1291 s$^{-1}$, as measured using a rotary viscometer (Rheolab QC instrument with C-LTD80/QC heating system from Anton Paar) at 23° C.

TABLE 1.1a

Preparation of waterborne basecoat materials WBM A1 and WBM A2 (not inventive) and WBM A3 (inventive)

| Aqueous phase: | WBM A1 | WBM A2 | WBM A3 |
|---|---|---|---|
| 3% strength Na Mg phyllosilicate solution | 15.23 | 15.23 | 15.23 |
| Deionized water | 5.68 | | |
| 1-Propoxy-2-propanol | 1.41 | 1.41 | 1.41 |
| 2-Ethylhexanol | 0.87 | 0.87 | 0.87 |
| Polyurethane-based graft copolymer; prepared as per page 35, line 33 to page 36, line 22 (example D-B2) of WO 2015/007427 A1 | 26.51 | | |
| Multistage acrylate, prepared as per Korea Polym. J., Vol. 7, No. 4, pp. 213-222) (aqueous dispersion BM8) | | 34.03 | |
| Aqueous dispersion (wD) BM2 | | | 31.23 |
| Polyester; prepared as per page 28, lines 13 to 33 (example BE1) of WO 2014/033135 A2 | 3.66 | | |
| Polyester; prepared as per example D, column 16, lines 37-59 of DE 40 09 858 A1 | | 4.85 | 4.85 |
| Melamine-formaldehyde resin (Cymel ® 203 from Allnex) | 5.44 | 5.44 | 5.44 |
| 10% strength dimethylethanolamine in water | 0.55 | 0.30 | 0.30 |
| 2,4,7,9-Tetramethyl-5-decynediol, 52% in BG (available from BASF SE) | 1.09 | 1.09 | 1.09 |
| Triisobutyl phosphate | 1.63 | 1.63 | 1.63 |
| Polyurethane-modified polyacrylate; prepared as per page 7, line 55 to page 8, line 23 of DE 4437535 A1 | 2.91 | 2.91 | 2.91 |
| Butyl glycol | 4.35 | 4.35 | 4.35 |
| Isopar ® L, available from Exxon Mobil | 1.84 | 1.84 | 1.84 |
| Pluriol ® P900, available from BASF SE | 0.54 | 0.54 | 0.54 |
| Hydrosol A170, available from DHC Solvent Chemie GmbH | 0.54 | 0.54 | 0.54 |
| White paste | 25.68 | 25.68 | 25.68 |
| Black paste | 1.53 | 1.52 | 1.52 |
| Yellow paste | 0.54 | 0.54 | 0.54 |

Preparation of the White Paste

The white paste is prepared from 50 parts by weight of titanium rutile 2310, 6 parts by weight of a polyester prepared as for example D, column 16, lines 37-59 of DE 40 09 858 A1, 24.7 parts by weight of a binder dispersion prepared as per patent application EP 022 8003 B2, page 8, lines 6 to 18, 10.5 parts by weight of deionized water, 4 parts by weight of 2,4,7,9-tetramethyl-5-decynediol, 52% in BG (available from BASF SE), 4.1 parts by weight of butyl glycol, 0.4 part by weight of 10% strength dimethylethanolamine in water, and 0.3 part by weight of Acrysol RM-8 (available from The Dow Chemical Company).

Preparation of the Black Paste

The black paste is prepared from 57 parts by weight of a polyurethane dispersion prepared as per WO 92/15405, page 13, line 13 to page 15, line 13, 10 parts by weight of carbon black (Monarch® 1400 carbon black from Cabot Corporation), 5 parts by weight of a polyester prepared as per example D, column 16, lines 37-59 of DE 40 09 858 A1, 6.5 parts by weight of a 10% strength aqueous dimethylethanolamine solution, 2.5 parts by weight of a commercial polyether (Pluriol® P900, available from BASF SE), 7 parts by weight of butyl diglycol, and 12 parts by weight of deionized water.

Preparation of the Yellow Paste

The yellow paste is prepared from 37 parts by weight of Bayferrox 3910 (available from Lanxess), 49.5 parts by weight of an aqueous binder dispersion prepared as per WO 91/15528, page 23, line 26 to page 25, line 24, 7.5 parts by weight of Disperbyk®-184 (available from BYK-Chemie GmbH), and 6 parts by weight of deionized water.

1.1b Preparation of a Noninventive Waterborne Basecoat Material WBM A4 and of an Inventive Waterborne Basecoat Material WBM A5

The components listed under "Aqueous phase" in table 1.1b are combined with stirring in the order stated to form an aqueous mixture. This mixture is then stirred for 10 minutes and adjusted using deionized water and dimethylethanolamine to a pH of 8 and to a spray viscosity of 105 mPa·s under a shearing load of 1000 s$^{-1}$, as measured using a rotary viscometer (Rheolab QC instrument with C-LTD80/QC heating system from Anton Paar) at 23° C.

TABLE 1.1b

Preparation of waterborne basecoat materials WBM A4 (not inventive) and WBM A5 (inventive)

| Aqueous phase: | WBM A4 | WBM A5 |
|---|---|---|
| Deionized water | 14.60 | 13.00 |
| 2-Ethylhexanol | 1.30 | 1.90 |
| Aqueous binder dispersion; prepared as per WO 92/15405, page 13, line 13 to page 15, line 13 | 9.00 | |
| Aqueous dispersion (wD) BM2 | | 33.00 |
| Polyester; prepared as per page 28, lines 13 to 33 (example BE1) of WO 2014/033135 A2 | 1.00 | 3.00 |
| Polyester; prepared as per example D, column 16, lines 37-59 of DE 40 09 858 A1 | | 4.50 |
| Melamine-formaldehyde resin (Cymel® 203 from Allnex) | 7.20 | 8.50 |
| 10% strength dimethylethanolamine in water | 0.90 | 0.40 |
| Triisobutyl phosphate | 1.00 | |
| Butyl glycol | | 3.00 |
| Isopar® L, available from Exxon Mobil | 2.20 | 2.40 |
| Isotridecyl alcohol | 1.80 | 1.90 |
| White paste 1 | 22.00 | |
| White paste 2 | | 21.50 |
| Black paste | 22.00 | 21.50 |
| Barium sulfate paste | 17.00 | |

Preparation of White Paste 1

The white paste is prepared from 50 parts by weight of titanium rutile R-960-38, 11 parts by weight of a polyester prepared as per example D, column 16, lines 37-59 of DE 40 09 858 A1, 16 parts by weight of a binder dispersion prepared as per international patent application WO 92/15405, page 15, lines 23-28, 16.5 parts by weight of deionized water, 3 parts by weight of butyl glycol, 1.5 parts by weight of 10% strength dimethylethanolamine in water, and 1.5 parts by weight of Pluriol® P900, available from BASF SE.

Preparation of White Paste 2

The white paste is prepared from 50 parts by weight of titanium rutile 2310, 6 parts by weight of a polyester prepared as for example D, column 16, lines 37-59 of DE 40 09 858 A1, 24.7 parts by weight of a binder dispersion prepared as per patent application EP 022 8003 B2, page 8, lines 6 to 18, 10.5 parts by weight of deionized water, 4 parts by weight of 2,4,7,9-tetramethyl-5-decynediol, 52% in BG (available from BASF SE), 4.1 parts by weight of butyl glycol, 0.4 part by weight of 10% strength dimethylethanolamine in water, and 0.3 part by weight of Acrysol RM-8 (available from The Dow Chemical Company).

Preparation of the Black Paste

The black paste is prepared from 58.9 parts by weight of a polyurethane dispersion prepared as per WO 92/15405, page 13, line 13 to page 15, line 13, 10.1 parts by weight of carbon black (Color Black FW2 from Orion Engineered Carbons), 5 parts by weight of a polyester prepared as per example D, column 16, lines 37-59 of DE 40 09 858 A1, 7.8 parts by weight of a 10% strength aqueous dimethylethanolamine solution, 2.2 parts by weight of a commercial polyether (Pluriol® P900, available from BASF SE), 7.6 parts by weight of butyl diglycol, and 8.4 parts by weight of deionized water.

Preparation of the Barium Sulfate Paste

The barium sulfate paste is prepared from 39 parts by weight of a polyurethane dispersion prepared as per EP 0228003 B2, page 8, lines 6 to 18, 54 parts by weight of barium sulfate (Blanc fixe micro from Sachtleben Chemie GmbH), 3.7 parts by weight of butyl glycol, and 0.3 part by weight of Agitan 282 (available from Münzing Chemie GmbH), and 3 parts by weight of deionized water.

1.2 Preparation of a Noninventive Waterborne Basecoat Material WBM B1, of a Noninventive Waterborne Basecoat Material WBM B2, and of an Inventive Waterborne Basecoat Material WBM B3

The components listed under "Aqueous phase" in table 1.2 are combined with stirring in the order stated to form an aqueous mixture. In the next step, an organic mixture is prepared from the components listed under "organic phase". The organic mixture is added to the aqueous mixture. This mixture is then stirred for 10 minutes and adjusted using deionized water and dimethylethanolamine to a pH of 8 and to a spray viscosity of 80±5 mPa·s under a shearing load of 1000 s$^{-1}$, as measured using a rotary viscometer (Rheolab QC instrument with C-LTD80/QC heating system from Anton Paar) at 23° C.

TABLE 1.2

Preparation of waterborne basecoat materials WBM B1
and WBM B2 (not inventive) and WBM B3 (inventive)

| | WBM B1 | WBM B2 | WBM B3 |
|---|---|---|---|
| Aqueous phase: | | | |
| 3% strength Na Mg phyllosilicate solution | 15.70 | 15.70 | 15.70 |
| Deionized water | 17.20 | 13.65 | 13.65 |
| Isopropanol | 1.50 | 1.50 | 1.50 |
| 2-Ethylhexanol | 1.70 | 1.70 | 1.70 |
| Aqueous binder dispersion; prepared as per WO 92/15405, page 13, line 13 to page 15, line 13 | 22.25 | | |
| Daotan ® VTW 6464, available from Allnex | 1.50 | | |
| Multistage acrylate, prepared as per Korea Polym. J., Vol. 7, No. 4, pp. 213-222 (aqueous dispersion BM8) | | 29.75 | |
| Aqueous dispersion (wD) BM2 | | | 27.30 |
| 3 wt % strength aqueous Rheovis ® AS 1130 solution, Rheovis ® AS 1130 available from BASF SE | 4.40 | 4.40 | 4.40 |
| Melamine formaldehyde resin (Cymel ® 1133 from Allnex) | 3.10 | 3.10 | 3.10 |
| 2,4,7,9-Tetramethyl-5-decynediol, 52% in BG (available from BASF SE) | 1.15 | 1.15 | 1.15 |
| 10% strength dimethylethanolamine in water | 0.50 | 0.50 | 0.50 |
| BYK-347 ® from Altana/BYK-Chemie GmbH | 0.50 | 0.50 | 0.50 |
| Pluriol ® P900, available from BASF SE | 0.35 | 0.35 | 0.35 |
| Triisobutyl phosphate | 1.00 | 1.00 | 1.00 |
| Polyurethane-modified polyacrylate; prepared as per page 7, line 55 to page 8, line 23 of DE 4437535 A1 | 2.50 | 2.50 | 2.50 |
| Butyl glycol | 2.20 | 2.20 | 2.20 |
| 50 wt % strength solution of Rheovis ® PU1250 in butyl glycol (Rheovis ® PU1250 available from BASF SE) | 0.20 | 0.20 | 0.20 |
| Tinuvin ® 384-2, available from BASF SE | 0.55 | 0.55 | 0.55 |
| Tinuvin ® 123, available from BASF SE | 0.35 | 0.35 | 0.35 |
| Red paste | 9.00 | 9.00 | 9.00 |
| Black paste | 0.60 | 0.60 | 0.60 |
| Mica paste 1 | 4.80 | 4.80 | 4.80 |
| Mica paste 2 | 1.60 | 1.60 | 1.60 |
| Organic phase: | | | |
| Paliocrom Orange L2804, available from BASF SE | 0.60 | 0.60 | 0.60 |
| Butyl glycol | 3.00 | 3.00 | 3.00 |
| Polyester; prepared as per example D, column 16, lines 37-59 of DE 40 09 858 A1 | 3.45 | 3.45 | 3.45 |
| 10% strength dimethylethanolamine in water | 0.30 | 0.30 | 0.30 |

Preparation of Red Paste

The red paste is prepared from 21 parts by weight of Paliogen Red L 3885, 45 parts by weight of an aqueous binder dispersion prepared as per WO 91/15528, page 23, line 26 to page 25, line 24, 2.5 percent by weight of 1-propoxy-2-propanol, 0.7 part by weight of 10% strength dimethylethanolamine in water, and 30.8 parts by weight of deionized water.

Preparation of Black Paste

The black paste is prepared from 57 parts by weight of a polyurethane dispersion prepared as per WO 92/15405, page 13, line 13 to page 15, line 13, 10 parts by weight of carbon black (®Monarch 1400 carbon black from Cabot Corporation), 5 parts by weight of a polyester prepared as per example D, column 16, lines 37-59 of DE 40 09 858 A1, 6.5 parts by weight of a 10% strength aqueous dimethylethanolamine solution, 2.5 parts by weight of a commercial polyether (Pluriol® P900, available from BASF SE), 7 parts by weight of butyl diglycol, and 12 parts by weight of deionized water.

Preparation of Mica Paste 1

The mica paste 1 is obtained by using a stirring element to mix 75 parts by weight of a mixing varnish prepared according to EP 1534792 B1, column 11, lines 1-17 with 25 parts by weight of the commercial Mica Mearlin Ext. Fine Russet 459V from BASF SE.

Preparation of Mica Paste 2

The mica paste 2 is obtained by using a stirring element to mix 75 parts by weight of a mixing varnish prepared according to EP 1534792 B1, column 11, lines 1-17 with 25 parts by weight of the commercial Mica Mearlin Ext. Super Russet 459V from BASF SE.

1.3 Preparation of a Noninventive Waterborne Basecoat Material WBM B4 and of an Inventive Waterborne Basecoat Material WBM B5

The components listed under "Aqueous phase" in table 1.3 are combined with stirring in the order stated to form an aqueous mixture. This mixture is then stirred for 10 minutes and adjusted using deionized water and dimethylethanolamine to a pH of 8 and to a spray viscosity of 95±5 mPa·s under a shearing load of 1000 s$^{-1}$, as measured using a rotary viscometer (Rheolab QC instrument with C-LTD80/QC heating system from Anton Paar) at 23° C.

TABLE 1.3

Preparation of waterborne basecoat materials
WBM B4 (not inventive) and WBM B5 (inventive)

| Aqueous phase: | WBM B4 | WBM B5 |
|---|---|---|
| 3% strength Na Mg phyllosilicate solution | 4.20 | 4.20 |
| Deionized water | 6.36 | 6.36 |
| Butyl glycol | 4.00 | 4.00 |
| 2-Ethylhexanol | 3.55 | 3.55 |
| Aqueous binder dispersion; prepared as per WO 92/15405, page 13, line 13 to page 15, line 13 | 15.50 | |
| Daotan ® VTW 6462, available from Allnex | 7.00 | |
| Aqueous dispersion (wD) BM2 | | 29.65 |
| Polyester; prepared as per example D, column 16, lines 37-59 of DE 40 09 858 A1 | 1.00 | 1.00 |
| Deionized water | 4.20 | 4.20 |
| 30 wt % strength aqueous Rheovis ® AS 1130 solution, available from BASF SE | 0.42 | 0.42 |
| Melamine formaldehyde resin (Cymel ® 203 from Allnex) | 7.70 | 7.80 |
| 2,4,7,9-Tetramethyl-5-decynediol, 52% in BG (available from BASF SE) | 1.80 | 1.80 |
| 10% strength dimethylethanolamine in water | 0.68 | 0.68 |
| Pluriol ® P900, available from BASF SE | 0.10 | 0.10 |
| Triisobutyl phosphate | 2.50 | 2.50 |
| Polyurethane-modified polyacrylate; prepared as per page 7, line 55 to page 8, line 23 of DE 4437535 A1 | 3.60 | |
| White paste | 35.00 | 35.00 |
| Yellow paste | 0.12 | 0.12 |
| Black paste | 0.11 | 0.11 |
| Steatite paste | 2.40 | 2.40 |

Preparation of White Paste

The white paste is prepared from 50 parts by weight of titanium rutile R-960-38, 11 parts by weight of a polyester prepared as per example D, column 16, lines 37-59 of DE 40 09 858 A1, 16 parts by weight of a binder dispersion prepared as per international patent application WO 92/15405, page 15, lines 23-28, 16.5 parts by weight of deionized water, 3 parts by weight of butyl glycol, 1.5 parts by weight of 10% strength dimethylethanolamine in water, and 1.5 parts by weight of Pluriol® P900, available from BASF SE.

Preparation of Yellow Paste

The yellow paste is prepared from 47 parts by weight of Sicotan Yellow L 1912, 45 parts by weight of an aqueous binder dispersion prepared as per WO 91/15528, page 23, line 26 to page 25, line 24, 2.7 percent by weight of 1-propoxy-2-propanol, 2.8 parts by weight of deionized water, 1.5 parts by weight of Disperbyk®-184 (available from BYK-Chemie GmbH), and 1 part by weight of Aerosil R 972 (available from Evonik Industries).

Preparation of Black Paste

The black paste is prepared from 40 parts by weight of Bayferrox 318 M (available from Lanxess), 39 parts by weight of an aqueous binder dispersion prepared as per WO 91/15528, page 23, line 26 to page 25, line 24, 2.0 percent by weight of 1-propoxy-2-propanol, 11.1 parts by weight of deionized water, 0.5 part by weight of Agitan 282 (available from Münzing Chemie GmbH), 4.4 parts by weight of Pluriol® P900 (available from BASF SE), and 3 parts by weight of 10% strength dimethylethanolamine in water.

Preparation of Steatite Paste

The steatite paste is prepared from 49.7 parts by weight of an aqueous binder dispersion prepared as per WO 91/15528, page 23, line 26 to page 25, line 24, 28.9 parts by weight of steatite (Microtalc IT extra from Mondo Minerals B.V.), 0.4 part by weight of Agitan 282 (available from Münzing Chemie GmbH), 1.45 parts by weight of Disperbyk®-184 (available from BYK-Chemie GmbH), 3.1 parts by weight of a commercial polyether (Pluriol® P900, available from BASF SE), and 16.45 parts by weight of deionized water.

1.4 Preparation of the Noninventive Waterborne Basecoat Materials WBM B6 and WBM B8 and of the Inventive Waterborne Basecoat Materials WBM B7 and WBM B9

The components listed under "Aqueous phase" in table 1.4 are combined with stirring in the order stated to form an aqueous mixture. This mixture is then stirred for 10 minutes and adjusted using deionized water and dimethylethanolamine to a pH of 8 and to a spray viscosity of 120±10 mPa·s (WBM B6 and WBM B8) or 110±10 mPa·s (WBM B7 and WBM B9) under a shearing load of 1000 s$^{-1}$, as measured using a rotary viscometer (Rheolab QC instrument with C-LTD80/QC heating system from Anton Paar) at 23° C.

TABLE 1.4

Preparation of waterborne basecoat materials WBM B6 and WBM B8 (not inventive) and WBM B7 and WBM B9 (inventive)

| Aqueous phase: | WBM B6 | WBM B7 | WBM B8 | WBM B9 |
|---|---|---|---|---|
| 3% strength Na Mg phyllosilicate solution | 13.71 | 13.71 | 13.54 | 13.54 |
| Deionized water | 14.37 | 10.15 | 12.93 | 8.03 |
| 2-Ethylhexanol | 1.40 | 1.40 | 1.54 | 1.54 |
| Aqueous binder dispersion; prepared as per WO 92/15405, page 13, line 13 to page 15, line 13 | 33.80 | | 39.14 | |
| Aqueous dispersion (wD) BM2 | | 38.02 | | 44.04 |
| Polyester; prepared as per example D, column 16, lines 37-59 of DE 40 09 858 A1 | 4.45 | 4.45 | 4.40 | 4.40 |
| Melamine formaldehyde resin (Cymel ® 3020 from Allnex) | 4.10 | 4.10 | | |
| Melamine formaldehyde resin (Cymel ® 303 from Allnex) | | | 3.96 | 3.96 |
| 10% strength dimethylethanolamine in water | 1.22 | 1.22 | 1.21 | 1.21 |
| 2,4,7,9-Tetramethyl-5-decynediol, 52% in BG (available from BASF SE) | 1.14 | 1.14 | 0.63 | 0.63 |
| Pluriol ® P900, available from BASF SE | 1.14 | 1.14 | 1.26 | 1.26 |
| Triisobutyl phosphate | 0.50 | 0.50 | 0.55 | 0.55 |
| NACURE 2500, available from King Industries, Inc | 0.66 | 0.66 | 0.72 | 0.72 |
| Polyurethane-modified polyacrylate; prepared as per page 7, line 55 to page 8, line 23 of DE 4437535 A1 | 3.70 | 3.70 | | |
| Butyl glycol | 5.24 | 5.24 | 5.18 | 5.18 |
| 50 wt % strength solution of Rheovis ® PU1250 in butyl glycol (Rheovis ® PU1250 available from BASF SE) | 0.57 | 0.57 | 0.63 | 0.63 |
| Black paste | 14.00 | 14.00 | 14.31 | 14.31 |

Preparation of Black Paste

The black paste is prepared from 57 parts by weight of a polyurethane dispersion prepared as per WO 92/15405, page 13, line 13 to page 15, line 13, 10 parts by weight of carbon black (Monarch® 1400 carbon black from Cabot Corporation), 5 parts by weight of a polyester prepared as per example D, column 16, lines 37-59 of DE 40 09 858 A1, 6.5 parts by weight of a 10% strength aqueous dimethylethanolamine solution, 2.5 parts by weight of a commercial polyether (Pluriol® P900, available from BASF SE), 7 parts by weight of butyl diglycol, and 12 parts by weight of deionized water.

1.5 Preparation of the Noninventive Waterborne Basecoat Materials WBM B10 and WBM B12 and of the Inventive Waterborne Basecoat Materials WBM B11 and WBM B13

The components listed under "Aqueous phase" in table 1.5 are combined with stirring in the order stated to form an aqueous mixture. This mixture is then stirred for 10 minutes and adjusted using deionized water and dimethylethanolamine to a pH of 8 and to a spray viscosity of 115±5 mPa·s (WBM B10 and WBM B12) or 90±5 mPa·s (WBM B11 and WBM B13) under a shearing load of 1000 s$^{-1}$, as measured using a rotary viscometer (Rheolab QC instrument with C-LTD80/QC heating system from Anton Paar) at 23° C.

TABLE 1.5

Preparation of waterborne basecoat materials WBM B10 and WBM B12 (not inventive) and WBM B11 and WBM B13 (inventive)

| Aqueous phase: | WBM B10 | WBM B11 | WBM B12 | WBM B13 |
|---|---|---|---|---|
| 3% strength Na Mg phyllosilicate solution | 13.10 | 13.10 | 11.790 | 11.790 |
| Deionized water | 9.49 | 10.53 | 12.96 | 8.39 |
| n-Propanol | 0.87 | 0.87 | 0.79 | 0.79 |
| n-Butoxypropanol | 1.38 | 1.38 | 1.24 | 1.24 |
| 2-Ethylhexanol | 2.77 | 2.77 | 2.49 | 2.49 |
| Aqueous binder dispersion; prepared as per WO 92/15405, page 13, line 13 to page 15, line 13 | 36.28 | | 36.44 | |
| Aqueous dispersion (wD) BM2 | | 35.24 | | 41.00 |

TABLE 1.5-continued

Preparation of waterborne basecoat materials WBM B10 and WBM B12 (not inventive) and WBM B11 and WBM B13 (inventive)

| Aqueous phase: | WBM B10 | WBM B11 | WBM B12 | WBM B13 |
|---|---|---|---|---|
| Polyester; prepared as per example D, column 16, lines 37-59 of DE 40 09 858 A1 | 2.95 | 2.95 | 2.66 | 2.66 |
| Melamine formaldehyde resin (Resimene ® HM 2608 from Ineos) | 4.10 | 4.10 | 3.70 | 3.70 |
| 10% strength dimethylethanol-amine in water | 0.30 | 0.30 | 0.27 | 0.27 |
| 2,4,7,9-Tetramethyl-5-decynediol, 52% in BG (available from BASF SE) | 1.38 | 1.38 | 1.25 | 1.25 |
| BYK-346, available from Altana/BYK-Chemie GmbH | 0.46 | 0.46 | 0.41 | 0.41 |
| Polyurethane-modified polyacrylate; prepared as per page 7, line 55 to page 8, line 23 of DE 4437535 A1 | 2.77 | 2.77 | | |
| Isopropanol | 1.64 | 1.64 | 1.48 | 1.48 |
| Butyl glycol | 1.00 | 1.00 | 0.90 | 0.90 |
| Isopar ® L, available from Exxon Mobil | 0.87 | 0.87 | 0.79 | 0.79 |
| NACURE 2500, available from King Industries, Inc | 0.42 | 0.42 | 0.38 | 0.38 |
| Black paste | 12.99 | 12.99 | 12.60 | 12.60 |
| Blue paste | 0.78 | 0.78 | | |
| Barium sulfate paste | 3.21 | 3.21 | 2.88 | 2.88 |
| Steatite paste | 3.25 | 3.25 | 2.93 | 2.93 |

Preparation of Black Paste

The black paste is prepared from 57 parts by weight of a polyurethane dispersion prepared as per WO 92/15405, page 13, line 13 to page 15, line 13, 10 parts by weight of carbon black (Monarch® 1400 carbon black from Cabot Corporation), 5 parts by weight of a polyester prepared as per example D, column 16, lines 37-59 of DE 40 09 858 A1, 6.5 parts by weight of a 10% strength aqueous dimethylethanolamine solution, 2.5 parts by weight of a commercial polyether (Pluriol® P900, available from BASF SE), 7 parts by weight of butyl diglycol, and 12 parts by weight of deionized water.

Preparation of Blue Paste

The blue paste was prepared from 69.8 parts by weight of a polyurethane dispersion prepared as per WO 92/15405, page 13, line 13 to page 15, line 13, 12.5 parts by weight of Paliogen® Blue L 6482 (available from BASF SE), 1.5 parts by weight of a 10% strength aqueous dimethylethanolamine solution, 1.2 parts by weight of a commercial polyether (Pluriol® P900, available from BASF SE), and 15 parts by weight of deionized water.

Preparation of Barium Sulfate Paste

The barium sulfate paste is prepared from 39 parts by weight of a polyurethane dispersion prepared as per EP 0228003 B2, page 8, lines 6 to 18, 54 parts by weight of barium sulfate (Blanc fixe micro from Sachtleben Chemie GmbH), 3.7 parts by weight of butyl glycol, and 0.3 part by weight of Agitan 282 (available from Münzing Chemie GmbH), and 3 parts by weight of deionized water.

Preparation of Steatite Paste

The steatite paste is prepared from 49.7 parts by weight of an aqueous binder dispersion prepared as per WO 91/15528, page 23, line 26 to page 25, line 24, 28.9 parts by weight of steatite (Microtalc IT extra from Mondo Minerals B.V.), 0.4 part by weight of Agitan 282 (available from Münzing Chemie GmbH), 1.45 parts by weight of Disperbyk®-184 (available from BYK-Chemie GmbH), 3.1 parts by weight of a commercial polyether (Pluriol® P900, available from BASF SE), and 16.45 parts by weight of deionized water.

Comparison of Waterborne Basecoat Materials WBM A2 and WBM A3

The amount of deionized water needed to set the spray viscosity for waterborne basecoat materials WBM A2 and WBM A3, and the resulting solids content of the respective formulation, are summarized in table 1.6.

TABLE 1.6

Amount of water to set the spray viscosity and resultant solids content of basecoat materials WBM A2 and WBM A3

| | WBM A2 | WBM A3 |
|---|---|---|
| Addition of water [parts by weight] to set the spray viscosity | 85.00 | 2.75 |
| Spray viscosity [mPa · s], measured at 1291/s | 90 | 90 |
| Solids content [%] | 19.1 | 32.6 |

The results demonstrate that the use of the multistage acrylate, used for comparison, in basecoat materials, in view of the high amount of deionized water needed to set the spray viscosity, results in a solids content which is well below that of inventive waterborne basecoat material WBM A3.

The running limit and popping limit were assessed for waterborne basecoat materials WBM A2 and WBM A3 in accordance with the methods described above. Here it was found that the popping limit and running limit were significantly higher when using a basecoat material for inventive use (see table 1.7).

TABLE 1.7

Popping and running limits of basecoat
materials WBM A2 and WBM A3

|  | WBM A2 | WBM A3 |
|---|---|---|
| Running limit [μm] | 6 μm | >50 μm |
| Popping limit | 9 μm | >40 μm |

Comparison Between Waterborne Basecoat Materials WBM B1 and WBM B2 and Waterborne Basecoat Material WBM B3

The amount of deionized water needed to set the spray viscosity for waterborne basecoat materials WBM B1, WBM B2 and WBM B3, and the resulting solids content of the respective formulation, are summarized in table 1.8.

TABLE 1.8

Amount of water to set the spray viscosity
and resultant solids content of basecoat materials
WBM B1, WBM B2 and WBM B3

|  | WBM B1 | WBM B2 | WBM B3 |
|---|---|---|---|
| Addition of water [parts by weight] to set the spray viscosity | 0 | 70 | 0 |
| Spray viscosity [mPa · s], measured at 1000 1/s | 76 | 83 | 77 |
| Solids content [%] | 21.9 | 13.1 | 21.2 |

The pinholing sensitivity was assessed according to the method described above. The results are summarized in table 1.9.

TABLE 1.9

Results of investigations into pinholing

Number of pinholes (standardized for 200 cm$^2$):

| Paint system 1. Waterborne basecoat as wedge | WBM A3 | WBM A3 |
|---|---|---|
| Paint system 2. Waterborne basecoat constant | WBM B1 | WBM B3 |
| Film thickness range basecoat total film (waterborne basecoat 1 + waterborne basecoat 2) |  |  |
| 0-20 μm | 5 | 0 |
| 20 μm-End of wedge | 34 | 1 |
| Total | 39 | 1 |

Number of pinholes (standardized for 200 cm$^2$):

| Paint system 1. Waterborne basecoat constant | WBM A3 | WBM A3 |
|---|---|---|
| Paint system 2. Waterborne basecoat as wedge | WBM B1 | WBM B3 |
| Film thickness range basecoat total film (waterborne basecoat 1 + waterborne basecoat 2) |  |  |
| 0-20 μm | 9 | 4 |
| 20 μm-End of wedge | 84 | 6 |
| Total | 93 | 10 |

The results from table 1.8 demonstrate that when using the multistage acrylate (WBM B2), used for comparison, in basecoat materials, on account of the large amount of deionized water needed to set the spray viscosity, a solids content results which is no longer acceptable for application in modern multicoat paint systems of the kind used in the automobile industry. An attempt was made to reduce the amount of water required to set spray viscosity (i.e., around 80 mPas at 1000 1/s) by significantly reducing the thickener proportion (of the 3% strength Na—Mg phyllosilicate solution) and thereby to increase the solids content. As a consequence of this, however, it emerged that the paint, following application and under the then low-shear conditions, had much too low a viscosity and hence caused massive runs.

The results from tables 1.8 and 1.9 show that while the comparative basecoat material WBM B1 does have an acceptable spray viscosity even without addition of water, it exhibits significant deficiencies at high film thicknesses in terms of the pinholing behavior. Especially when using waterborne basecoat materials for inventive use to produce all of the basecoat films present, there is a qualitatively enormously high-grade pinholing robustness even at high film thicknesses.

Comparison Between Waterborne Basecoat Material WBM B4 and WBM B5

The investigations on waterborne basecoat materials WBM B4 and WBM B5 took place in accordance with the above-described method of "film thickness-dependent leveling, variant B".

TABLE 1.10

Results of investigations into the film
thickness-dependent leveling

| Paint system 1. Waterborne basecoat constant | WBM A3 | WBM A3 |
|---|---|---|
| Paint system 2. Waterborne basecoat as wedge | WBM B4 | WBM B5 |

| Appearance index | Film thickness range 2. waterborne basecoat |  |  |
|---|---|---|---|
| SW | 15-20 μm | 30.7 | 28.9 |
|  | 20-25 μm | 33.9 | 31.1 |
| LW | 15-20 μm | 11.0 | 11.6 |
|  | 20-25 μm | 10.9 | 11.7 |
| DOI | 15-20 μm | 71.4 | 75.3 |
|  | 20-25 μm | 70.0 | 73.1 |

The results show that especially when using waterborne basecoat materials for inventive use for producing all of the basecoat films present, the multicoat paint system is qualitatively extremely high-grade in particular with regard to short wave and DOI.

Comparison Between Waterborne Basecoat Materials WBM B6 and WBM B8 and Waterborne Basecoat Materials WBM B7 and WBM B9

The investigation on waterborne basecoat materials WBM B6 and WBM B8 and also WBM B7 and WBM B9 were carried out according to the above-described methods of "pinholes, variant A and B", "runs", and "film thickness-dependent leveling, variant A and B".

TABLE 1.11

Results of investigations into pinholing

Number of pinholes (standardized for 200 cm$^2$):

| Paint system 1. Waterborne basecoat as wedge | WBM A3 | WBM A3 | WBM A3 | WBM A3 |
|---|---|---|---|---|

TABLE 1.11-continued

Results of investigations into pinholing

| Paint system 2. Waterborne basecoat constant Film thickness range basecoat total film (waterborne basecoat 1 + waterborne basecoat 2) | WBM B6 | WBM B7 | WBM B8 | WBM B9 |
|---|---|---|---|---|
| 0-20 μm | 5 | 8 | 0 | 3 |
| 20 μm-End of wedge | 65 | 7 | 76 | 3 |
| Total | 70 | 15 | 76 | 6 |

Number of pinholes (standardized for 200 cm²):

| Paint system 1. Waterborne basecoat constant | WBM A3 | WBM A3 | WBM A3 | WBM A3 |
|---|---|---|---|---|
| Paint system 2. Waterborne basecoat as wedge Film thickness range basecoat total film (waterborne basecoat 1 + waterborne basecoat 2) | WBM B6 | WBM B7 | WBM B8 | WBM B9 |
| 0-20 μm | 0 | 0 | 0 | 1 |
| 20 μm-End of wedge | >2500 | 2 | 440 | 4 |
| Total | >2500 | 2 | 440 | 5 |

All of the multicoat paint systems produced exhibited good pinholing robustness in the low range of the total film thickness of all basecoat films present. The particularly preferred systems, in which each basecoat material used comprises an inventive dispersion, have a correspondingly good pinholing robustness even at very high total film thicknesses.

TABLE 1.12

Results of the investigations into running stability

|  | WBM B6 | WBM B7 | WBM B8 | WBM B9 |
|---|---|---|---|---|
| Running limit (>0 mm): | 11 μm | 15 μm | 17 μm | >30 μm |
| Running limit (>10 mm): | 23 μm | 32 μm | 31 μm | >50 μm |

The waterborne basecoat materials for inventive use (WBM B7 and WBM B9) differ in comparison to the respective noninventive references (WBM B6 as reference for WBM B7, and WBM B8 as reference for WBM B9) in having a lower running tendency.

TABLE 1.13

Results of investigations into the film thickness-dependent leveling

|  |  | Paint system 1. Waterborne basecoat constant | WBM A3 | WBM A3 |
|---|---|---|---|---|
|  |  | Paint system 2. Waterborne basecoat as wedge | WBM B6 | WBM B7 |
| Appearance index |  | Film thickness range 2. basecoat |  |  |
| SW |  | 10 μm-15 μm | 17.0 | 10.6 |
|  |  | 15 μm-20 μm | 17.4 | 13.0 |
|  |  | 20 μm-25 μm | 17.7 | 14.1 |

TABLE 1.13-continued

Results of investigations into the film thickness-dependent leveling

|  |  | | |
|---|---|---|---|
|  | 25 μm-30 μm | 23.8 | 17.5 |
|  | 30 μm-35 μm | 28.2 | 19.0 |
| LW | 10 μm-15 μm | 8.5 | 10.3 |
|  | 15 μm-20 μm | 7.2 | 11.2 |
|  | 20 μm-25 μm | 6.1 | 11.9 |
|  | 25 μm-30 μm | 16.4 | 11.4 |
|  | 30 μm-35 μm | 34.9 | 11.2 |
| DOI | 10 μm-15 μm | 90.5 | 96.0 |
|  | 15 μm-20 μm | 90.9 | 95.4 |
|  | 20 μm-25 μm | 90.7 | 94.8 |
|  | 25 μm-30 μm | 84.1 | 93.2 |
|  | 30 μm-35 μm | 71.1 | 92.5 |

Relative to the WBM A3/WBM B6 system, advantages are found for the WBM A3/WBM B7 system in terms of short wave (SW) and long wave (LW) in the higher film thickness range. Here it is found for the LW measured for the wedge of the waterborne basecoat material WBM B7 that it is virtually independent of the film thickness, in comparison to waterborne basecoat material WBM B6, whereas the LW in the case of WBM B6 increased drastically as the film thickness goes up.

The effect of using the WBM A3/WBM B7 system relative to the WBM A3/WBM B6 system, moreover, is an improvement in the distinctness of image (DOI); the corresponding particularly preferred system shows a significantly lower decrease in the DOI with increasing film thickness of the 2nd waterborne basecoat.

Comparison Between Waterborne Basecoat Materials WBM B10 and WBM B12 and Waterborne Basecoat Materials WBM B11 and WBM B13

The investigations on waterborne basecoat materials WBM B10 and WBM B12 and also WBM B11 and WBM B13 were carried out according to the above-described methods of "pinholes, variant A and B", and "film thickness-dependent leveling, variant A and B".

TABLE 1.14

Results of investigations into pinholing

Number of pinholes (standardized for 200 cm²):

| Paint system 1. Waterborne basecoat as wedge | WBM A1 | WBM A1 |
|---|---|---|
| Paint system 2. Waterborne basecoat constant | WBM B10 | WBM B11 |
| Film thickness range basecoat total film (waterborne basecoat 1 + waterborne basecoat 2) |  |  |
| 0-20 μm | 6 | 10 |
| 20 μm-End of wedge | 160 | 24 |
| Total | 166 | 34 |

Number of pinholes (standardized for 200 cm²):

| Paint system 1. Waterborne basecoat constant | WBM A1 | WBM A1 |
|---|---|---|
| Paint system 2. Waterborne basecoat as wedge | WBM B10 | WBM B11 |
| Film thickness range basecoat total film (waterborne basecoat 1 + waterborne basecoat 2) |  |  |
| 0-20 μm | >100 | 63 |
| 20 μm-End of wedge | >500 | 21 |
| Total | >600 | 84 |

The results show that the inventive system has distinct advantages in terms of pinholing stability, especially in the range of high film thicknesses.

TABLE 1.15

Further results of investigations into pinholing

Number of pinholes (standardized for 200 cm²):

| | | | | |
|---|---|---|---|---|
| Paint system 1. Waterborne basecoat as wedge | WBM A3 | WBM A3 | WBM A3 | WBM A3 |
| Paint system 2. Waterborne basecoat constant | WBM B10 | WBM B11 | WBM B12 | WBM B13 |
| Film thickness range basecoat total film (waterborne basecoat 1 + waterborne basecoat 2) | | | | |
| 0-20 μm | 5 | 7 | 0 | 0 |
| 20 μm-End of wedge | 296 | 2 | 464 | 0 |
| Total | 301 | 9 | 464 | 0 |

Number of pinholes (standardized for 200 cm²):

| | | | | |
|---|---|---|---|---|
| Paint system 1. Waterborne basecoat constant | WBM A3 | WBM A3 | WBM A3 | WBM A3 |
| Paint system 2. Waterborne basecoat as wedge | WBM B10 | WBM B11 | WBM B12 | WBM B13 |
| Film thickness range basecoat total film (waterborne basecoat 1 + waterborne basecoat 2) | | | | |
| 0-20 μm | >500 | 7 | 0 | 0 |
| 20 μm-End of wedge | >1000 | 0 | >1600 | 0 |
| Total | >1500 | 7 | >1600 | 0 |

The majority of multicoat paint systems produced exhibit good pinholing robustness in the low range of the total film thickness for all the basecoat films present. The particularly preferred systems, in which each basecoat material used comprises an inventive dispersion, have a correspondingly good pinholing robustness even at very high total film thicknesses.

The results underscore again that the particularly preferred systems, in which all of the basecoat materials used comprise an aqueous dispersion (wD), have advantages. While all of the inventive multicoat paint systems exhibit good values in the lower film thickness range, the advantages of the particularly preferred systems, particularly at

TABLE 1.16

Results of investigations into the film thickness-dependent leveling

| | | | | | |
|---|---|---|---|---|---|
| | Paint system 1. Waterborne basecoat as wedge | WBM A3 | WBM A3 | WBM A3 | WBM A3 |
| | Paint system 2. Waterborne basecoat constant | WBM B10 | WBM B11 | WBM B12 | WBM B13 |

| Appearance index | Film thickness range 2. basecoat | WBM B10 | WBM B11 | WBM B12 | WBM B13 |
|---|---|---|---|---|---|
| SW | 5 μm-10 μm | 19.6 | 18.0 | 19.3 | 17.2 |
| | 10 μm-15 μm | 24.1 | 15.9 | 20.8 | 17.4 |
| | 15 μm-20 μm | 29.3 | 16.2 | 23.2 | 18.2 |
| | 20 μm-25 μm | 34.1 | 18.0 | 25.9 | 19.7 |
| | 25 μm-30 μm | 35.1 | 20.9 | 27.8 | 20.9 |
| LW | 5 μm-10 μm | 4.2 | 4.9 | 7.6 | 12.6 |
| | 10 μm-15 μm | 4.6 | 4.5 | 8.3 | 11.1 |
| | 15 μm-20 μm | 5.6 | 4.7 | 9.3 | 11.2 |
| | 20 μm-25 μm | 10.4 | 5.1 | 10.3 | 10.2 |
| | 25 μm-30 μm | 12.3 | 5.3 | 14.1 | 9.2 |
| DOI | 5 μm-10 μm | 90.9 | 93.0 | 92.3 | 92.8 |
| | 10 μm-15 μm | 84.6 | 93.0 | 87.9 | 92.9 |
| | 15 μm-20 μm | 78.6 | 91.6 | 86.8 | 92.5 |
| | 20 μm-25 μm | 72.2 | 89.6 | 84.3 | 91.7 |
| | 25 μm-30 μm | 70.5 | 87.2 | 81.5 | 91.3 | higher film thicknesses, are evident in short wave (SW) and in long wave (LW) or in the distinctness of image (DOI).

Comparison Between Waterborne Basecoat Material WBM A4 and Waterborne Basecoat Material WBM A5

The investigations on waterborne basecoat materials WBM A4 and WBM A5, in each case in combination with the waterborne basecoat material WBM B4, take place according to the above-described method of "film thickness-independent leveling".

TABLE 1.17

Results of the investigations into film thickness-independent leveling

| | | |
|---|---|---|
| Paint system 1. Waterborne basecoat | WBM A4 | WBM A5 |
| Paint system 2. Waterborne basecoat | WBM B4 | WBM B4 |
| SW | 28.0 | 22.0 |
| LW | 5.0 | 4.7 |
| DOI | 88.6 | 92.8 |

The results underscore again that the inventive systems, in which at least one basecoat material used comprises an aqueous dispersion (wD), have advantages. All of the inventive multicoat paint systems have clear advantages in short wave (SW) and in long wave (LW) and also in the distinctness of image (DOI).

Comparison Between Waterborne Basecoat Material WBM B10 and Waterborne Basecoat Material WBM B11

The investigations on waterborne basecoat materials WBM B10 and WBM B11 take place in accordance with the above-described methods of "Adhesion properties after condensation", "runs", and "film thickness-dependent leveling (variant C)".

TABLE 1.18

Adhesion after condensation storage

| | Waterborne basecoat | |
|---|---|---|
| Adhesion after condensation storage | WBM B10 | WBM B11 |
| Cross-cut | 0.5 | 0.5 |
| Steam jet | 1 | 1 |
| Stonechip | 2 | 1.5 |

The waterborne basecoat material WBM B11 is comparable in terms of cross-cut and steam jet with the reference WBM B10, but exhibits advantages in terms of stonechipping.

TABLE 1.19

Running behavior

| | Waterborne basecoat | |
|---|---|---|
| Runs | WBM B10 | WBM B11 |
| Runs start | 10 μm | >30 μm |
| Runs 10 mm | 28 μm | >30 μm |

The results demonstrate that the inventive systems, in which the basecoat material used comprises an aqueous dispersion (wD) (WBM B11), exhibit advantages in terms of the running behavior. When using WBM B11, even at the maximum film thickness, there are still no discernible tendencies toward development of runs.

TABLE 1.20

Results of the investigations into film thickness-dependent leveling

| | | Waterborne basecoat | |
|---|---|---|---|
| Appearance index | Film thickness range basecoat | WBM B10 | WBM B11 |
| SW | 10 μm-15 μm | 13.2 | 12.8 |
| | 15 μm-20 μm | 15.0 | 12.9 |
| | 20 μm-25 μm | 15.7 | 12.1 |
| | 25 μm-30 μm | 15.8 | 12.0 |
| LW | 10 μm-15 μm | 3.6 | 2.7 |
| | 15 μm-20 μm | 3.0 | 2.4 |
| | 20 μm-25 μm | 2.7 | 2.6 |
| | 25 μm-30 μm | 2.9 | 2.7 |
| DOI | 10 μm-15 μm | 93.3 | 94.4 |
| | 15 μm-20 μm | 93.0 | 94.4 |
| | 20 μm-25 μm | 92.7 | 94.7 |
| | 25 μm-30 μm | 92.2 | 94.8 |

The results underscore again that the inventive systems, in which the basecoat material used comprises an aqueous dispersion (wD), have advantages. The inventive multicoat paint system has distinct advantages in short wave (SW) and in long wave (LW) and also in the distinctness of image (DOI).

What is claimed is:

1. A method for producing a multicoat paint system (M) on a metallic substrate (S), comprising
   (1) producing a cured electrocoat (E.1) on the metallic substrate (S) by electrophoretic application of an electrocoat material (e.1) to the substrate (S) and subsequent curing of the electrocoat material (e.1),
   (2) producing a basecoat (B.2.1) or two or more directly successive basecoats (B.2.2.x) directly on the cured electrocoat (E.1) by application of an aqueous basecoat material (b.2.1) directly to the electrocoat (E.1) or directly successive application of two or more basecoat materials (b.2.2.x) to the electrocoat (E.1),
   (3) producing a clearcoat (K) directly on the basecoat (B.2.1) or on the topmost basecoat (B.2.2.x) by application of a clearcoat material (k) directly to the basecoat (B.2.1) or to the topmost basecoat (B.2.2.x),
   (4) jointly curing the basecoat (B.2.1) and the clearcoat (K) or the basecoats (B.2.2.x) and the clearcoat (K), and
   wherein
   the basecoat material (b.2.1) or at least one of the basecoat materials (b.2.2.x) comprises at least one aqueous dispersion (wD),
   the dispersion (wD) comprising at least one polymer having a particle size of 100 to 500 nm, wherein the at least one polymer is produced by successive radical emulsion polymerization of a mixture (A), a mixture (B), and a mixture (C) of olefinically unsaturated monomers,
   the mixture (A) comprising at least 50 wt % of olefinically unsaturated monomers having a solubility in water of less than 0.5 g/l at 25° C., wherein the olefinically unsaturated monomers present in the mixture (A) are selected such that a polymer prepared from the mixture (A) possesses a glass transition temperature of 10 to 65° C.,
   the mixture (B) comprising at least one polyolefinically unsaturated monomer, wherein the at least one polyolefinically unsaturated monomer present in the mixture (B) is selected such that a polymer prepared from the mixture (B) possesses a glass transition temperature of −35 to 15° C.,
and
a polymer prepared from the mixture (C) possessing a glass transition temperature of −50 to 15° C.,
and wherein,
i. first of all the mixture (A) is polymerized,
ii. then the mixture (B) is polymerized in the presence of the polymer prepared from the polymerization of the mixture (A),
and
iii. thereafter the mixture (C) is polymerized in the presence of the polymer prepared from the polymerization of the polymer prepared from the polymerization of the mixture (A) and the polymer prepared from the polymerization of the mixture (B).

2. The method as claimed in claim 1, wherein the fraction of the mixture (A) is from 0.1 to 10 wt %, the fraction of the mixture (B) is from 60 to 80 wt %, and the fraction of the mixture (C) is from 10 to 30 wt %, based in each case on the sum of the individual amounts of the mixtures (A), (B), and (C).

3. The method as claimed in claim 1, wherein the mixture (A) comprises at least one mono-unsaturated ester of (meth)acrylic acid having an alkyl radical, and at least one monoolefinically unsaturated monomer containing vinyl groups and having, located on at least one vinyl group, a radical which is aromatic or which is mixed saturated-aliphatic-aromatic, in which case the aliphatic moieties of the radical are alkyl groups.

4. The method as claimed in claim 1, wherein the mixture (B) comprises, in addition to the at least one polyolefinically unsaturated monomer, at least one monounsaturated ester of (meth)acrylic acid having an alkyl radical and at least one monoolefinically unsaturated monomer containing vinyl groups and having, located on at least one vinyl group, a radical which is aromatic or which is mixed saturated-aliphatic-aromatic, in which case the aliphatic moieties of the radical are alkyl groups.

5. The method as claimed in claim 1, wherein the mixture (B) comprises, as the at least one polyolefinically unsaturated monomers, exclusively diolefinically unsaturated monomers.

6. The method as claimed in claim 1, wherein the mixtures (A) and (B) comprise no hydroxy-functional monomers and no acid-functional monomers.

7. The method as claimed in claim 1, wherein the mixture (C) comprises at least one alpha-beta unsaturated carboxylic acid, at least one monounsaturated ester of (meth)acrylic acid having an alkyl radical substituted by a hydroxyl group, and at least one monounsaturated ester of (meth)acrylic acid having an alkyl radical.

8. The method as claimed in claim 1, wherein addition of olefinically unsaturated monomers in stages i. to iii. is a metered addition such that in a reaction solution a fraction of a free monomer of 6.0 wt %, based on the total amount of the monomers used in the respective polymerization stage, is not exceeded throughout the reaction time.

9. The method as claimed in claim 1, wherein the basecoat material (b.2.1) or at least one of the basecoat materials (b.2.2.x) further comprises at least one further polymer as binder, selected from the group consisting of hydroxy-functional polyurethanes, polyesters, polyacrylates, and copolymers of these polymers.

10. The method as claimed in claim 1, wherein the basecoat material (b.2.1) or at least one of the basecoat materials (b.2.2.x) further comprises a melamine resin as crosslinking agent.

11. The method as claimed in claim 1, wherein the basecoat material (b.2.1) or at least one of the basecoat materials (b.2.2.x) comprises at least one color and/or effect pigment.

12. The method as claimed in claim 1, wherein the basecoat material (b.2.1) or at least one of the basecoat materials (b.2.2.x) is a one-component coating composition.

13. The method as claimed in claim 1, wherein the joint curing (4) is carried out at temperatures of 100 to 250° C. for a time of 5 to 60 min.

14. The method as claimed in claim 1, wherein the percentage sum of the solids content and the fraction of water of the basecoat material (b.2.1) or of at least one of the basecoat materials (b.2.2.x) is at least 70 wt %.

15. A multicoat paint system (M) produced by the method as claimed in claim 1.

16. The method as claimed in claim 9, wherein all of the basecoat materials (b.2.2.x) further comprise at least one further polymer as binder, selected from the group consisting of hydroxy-functional polyurethanes, polyesters, polyacrylates, and copolymers of these polymers.

17. The method as claimed in claim 10, wherein all of the basecoat materials (b.2.2.x) further comprise a melamine resin as crosslinking agent.

18. The method as claimed in claim 11, wherein all of the basecoat materials (b.2.2.x) comprise at least one color and/or effect pigment.

19. The method as claimed in claim 12, wherein all of the basecoat materials (b.2.2.x) are one-component coating compositions.

20. The method as claimed in claim 14, wherein the percentage sum of the solids content and the fraction of water of all of the basecoat materials (b.2.2.x) is 80 to 90 wt %.

* * * * *